(12) United States Patent
Li et al.

(10) Patent No.: US 6,563,957 B1
(45) Date of Patent: May 13, 2003

(54) TONE DEPENDENT ERROR DIFFUSION

(75) Inventors: Pingshan Li, West Lafayette, IN (US); Jan P. Allebach, West Lafayette, IN (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/307,007

(22) Filed: May 7, 1999

(51) Int. Cl.[7] .................................................. G06K 9/46
(52) U.S. Cl. ....................... 382/252; 382/237; 358/3.03; 358/3.04
(58) Field of Search .................................. 382/252, 232, 382/237, 251; 358/1.9, 455, 456, 458, 465, 466, 3.03, 3.04, 3.05

(56) References Cited

U.S. PATENT DOCUMENTS

| | | | |
|---|---|---|---|
| 4,876,610 A | 10/1989 | Ohsawa et al. | 358/443 |
| 5,313,287 A | 5/1994 | Barton | 358/458 |
| 5,696,846 A | * 12/1997 | Shimazaki | 382/254 |
| 5,737,453 A | 4/1998 | Ostromoukhov | 382/275 |
| 5,757,976 A | 5/1998 | Shu | 382/252 |
| 6,144,775 A | * 11/2000 | Williams et al. | 382/252 |
| 6,172,768 B1 | * 1/2001 | Yamada et al. | 358/1.9 |

FOREIGN PATENT DOCUMENTS

EP                 0544511         6/1993

OTHER PUBLICATIONS

J. Shu, "38.2: Adaptive Filtering For Error–Diffusion Quality Improvement", SID 95 Digest, pp. 833–835, 1995.

Reiner Eschbach, "Reduction of Artifacts In Error Diffusion By Means Of Input–Dependent Weights", Journal of Electronic Imaging, Oct. 1993, vol. 2(4), Oct. 1993, pp. 352–358.

Reiner Eschbach et al, "Error–Diffusion Algorithm With Edge Enhancement", J. Opt. Soc. Am. A, vol. 8, No. 12, Dec. 1991, 1991 Optical Society of America, pp. 1844–1850.

Zhigang Fan et al., "Edge Behavior Of Error Diffusion", Proceedings of the 1995 IEEE International Conference on Image Processing, vol. III, pp. 113–116, Washington, D.C., Oct. 1995.

Robert W. Floyd et al., "An Adaptive Algorithm For Spatial Greyscale", Proceedings of the S.I.D., vol. 17, No. 2, Second Quarter 1976, pp. 75–77.

(List continued on next page.)

Primary Examiner—Thomas D. Lee

(57) ABSTRACT

A tone dependent error diffusion halftoning system uses tone dependent thresholds and error weightings that are optimized by minimizing a model based cost function. An upper and lower threshold are used to compare with the modified pixel value. If the modified pixel value is greater than the upper threshold, a dot is printed, if less than the lower threshold, no dot is printed, and if between, a binary bitmap is used to determine whether a dot should be printed. For each midtone threshold level, a halftone image is generated by a direct binary search method and an error diffusion method. The magnitudes of the fast Fourier transforms, of the halftone images are compared using a visual cost function and the thresholds and error weightings are altered to minimize the cost function. For highlight and shadow tone levels, a filtered halftone image from an error diffusion system is compared to the continuous tone image after filtering the image via a human visual system model. Again by minimizing the cost function, the thresholds and error weightings are optimized.

23 Claims, 20 Drawing Sheets

OTHER PUBLICATIONS

Keith T. Knox et al., "Threshold Modulation In Error Diffusion", Journal of Electronic Imaging, Jul. 1993, vol. 2(3), pp. 185–192.

Bernd W. Kolpatzik, "Optimized Error Diffusion For Image Display", Journal of Electronic Imaging, Jul. 1992, vol. 1(3), pp. 277–292.

J. Sullivan et al., "Image Halftoning Using A Visual Model In Error Diffusion", J. Opt. Soc. Am.A/vol. 10, No. 8, Aug. 1993, pp. 1714–1724.

Ping Wah Wong, "Adaptive Error Diffusion And Its Application In Multiresolution Rendering", IEEE Transactions on image Processing, vol. 5, No. 7, Jul. 1996, pp. 1184–1196.

Ping Wah Wong, "Optimum Error Diffusion Kernel Design", SPIE vol. 3018, pp. 236–242.

Robert Ulichney, "Digital Hlalftoning", The MIT Press, Cambridge, Massachusetts, London, England, 1987 Massachusetts Institute of Technology.

European Search Report dated Jul. 25, 2002.

* cited by examiner

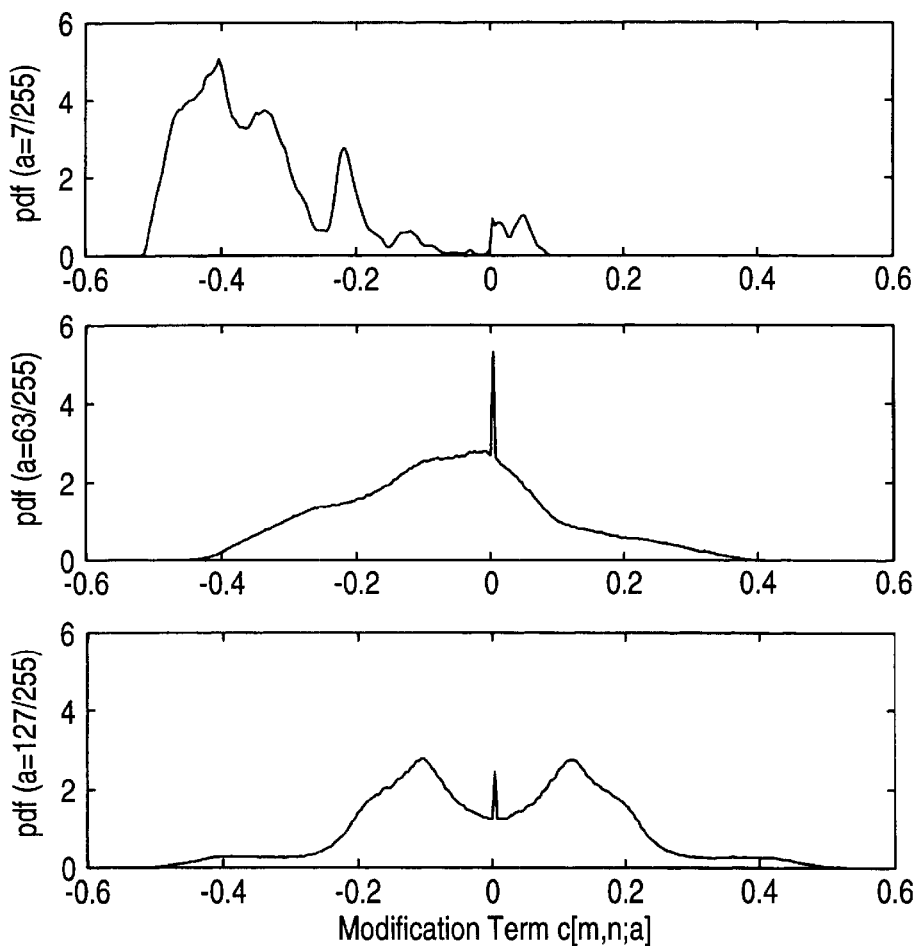
FIG. 19A
FIG. 19B
FIG. 19C
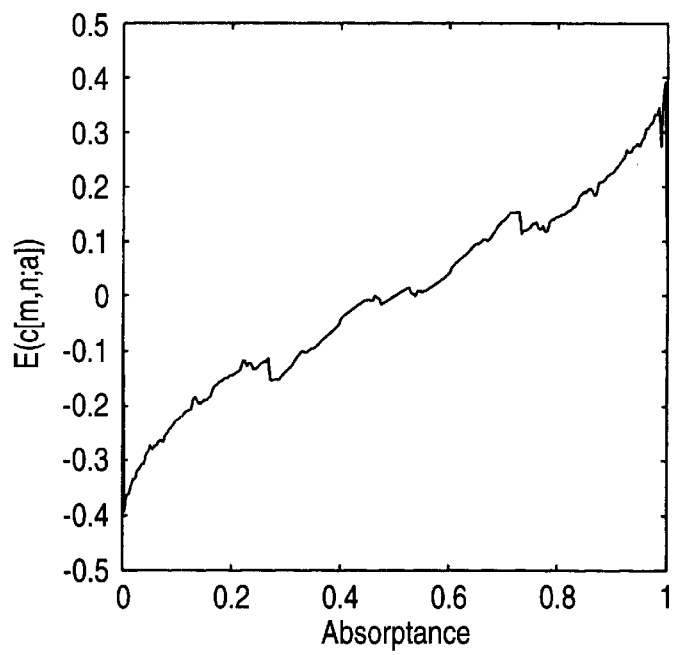
FIG. 20

TONE DEPENDENT ERROR DIFFUSION

FIELD OF THE INVENTION

The present invention relates to a tone dependent error diffusion halftoning method, and in particular to an efficient tone dependent error diffusion halftoning method with optimized thresholds and error weights that produce a high quality halftone image.

BACKGROUND

Continuous-tone images, such as charts, drawings, and pictures, may be represented as a two-dimensional matrix of picture elements (pixels). The spatial resolution and intensity level for each pixel are chosen to correspond to the particular output device used.

Digital halftoning is the process of transforming a continuous-tone image to a binary image, i.e., the pixel is either on or off. The low pass characteristic of the human visual system allows the binary texture patterns to be perceived as continuous-tones.

Hardcopy output devices, such as inkjet printers, are bi-level devices that eject droplets of ink to form dots on a medium. Such printers cannot print continuous-tone images and, thus, use digital halftoning so that the printed binary image on the medium will be perceived as the original image.

For printing applications, absorptance is used to represent a pixel value. A printing process typically puts absorptive dots on white paper. For an ideal device model, the colorant absorptance is 1 (a dot is printed); and the paper absorptance is 0 (no dot is printed). A pixel value in a general continuous-tone, i.e., gray scale, image is represented in units of absorptance between 0 and 1. It should be understood, of course, that the pixel value may be represented by a "near continuous-tone" range, e.g., from 0 to 255, as is used in conventional computer monitors. The binary tone level in such a case will be represented as either 0 (off) or 255 (on).

Halftoning methods are described in the book Digital Halftoning, by Robert Ulichney, The MIT Press, 1987, incorporated herein by reference. Generally, halftoning methods can be grouped into three categories. They are iterative optimization methods, screening, and error diffusion.

Iterative methods use a human visual system model to minimize the perceived error between the continuous-tone image and the halftone image. An iterative method is direct binary search, which can be used to create high quality halftone images. Unfortunately, iterative methods require a great deal of computation which makes real time image processing impractical.

Screening, on the other hand, is a low complexity halftoning method that does not provide very high quality halftone images. A screen is defined by a matrix of threshold values. To binarize a continuous-tone image, the threshold matrix is periodically tiled over the image. Pixels that are greater than the corresponding matrix threshold values are binarized to 1; otherwise they are binarized to 0.

Error diffusion halftoning methods use a feedback loop to subtract the past weighted diffused errors from an input pixel value to obtain a modified pixel value. The modified pixel value is then compared with a threshold value to determine the halftone output value. Thus, the decision about whether or not to print a dot at a particular pixel is based not only on the continuous-tone level for that pixel, but on what has happened before for previously processed pixels. The error to be diffused, i.e., the quantizer error, is obtained by subtracting the modified pixel value from the output value. The error is then diffused to a set of future pixel locations by subtracting the weighted error from the future pixel locations. The local tone will be preserved if the sum of the weights is 1.

Error diffusion is an efficient halftoning method compared with direct binary search, but is more complex than screening. However, halftone images produced by conventional error diffusion methods are typically of lower quality than images produced by direct binary search methods.

A well known error diffusion technique is described by R. Floyd and L. Steinberg in the paper Adaptive Algorithm for Spatial Grey Scale, SID Int'l. Sym. Digest of Tech. Papers, pp. 36–37 (1975), incorporated herein by reference.

A diagram of the conventional error diffusion system 10 is shown in FIG. 1. As shown in FIG. 1, the input pixel value, which has continuous-tone value, is represented as f[m,n], where m and n are the pixel locations; the modified pixel value is represented by u[m,n]; and the output halftone value is represented by g[m,n], which is determined by a thresholding operation as follows:

$$g[m,n] = \begin{cases} 1, & \text{if } u[m,n] \geq t[m,n], \\ 0, & \text{otherwise}, \end{cases} \quad \text{equ. 1}$$

where t[m,n] is the threshold matrix 12.

The quantizer error d[m,n] is determined by subtracting the modified pixel value u[m,n] from the output halftone value g[m,n] at adder 14 as follows:

$$d[m,n] = g[m,n] - u[m,n]. \quad \text{equ. 2}$$

The quantizer error d[m,n] is then diffused to neighboring, subsequently processed pixel locations through the error-weighting matrix 16.

The modified pixel value u[m,n] is updated as:

$$u[m+k, n+1] \leftarrow u[m+k, n+1] - w[k,l]d[m,n], \quad \text{equ. 3}$$

where w[k,l] is the error-weighting matrix 16. To preserve the local tone, $$\sum_{k,l} w[k,l] = 1 \quad \text{equ. 4}$$

Thus, the inputs to adder 18 may be represented as:

$$u[m,n] = f[m,n] - \sum_{k,l} w[k,l]d[m-k, n-1] \quad \text{equ. 5}$$
$$= f[m,n] - c[m,n]$$

were c[m,n] is the modification term defined by:

$$c[m,n] = \sum_{k,l} w[k,l]d[m-k, n-1]. \quad \text{equ. 6}$$

Thus, the modification term c[m,n] is the diffused quantizer errors from previously processed pixels.

The conventional error diffusion system 10 binarizes an image in conventional raster scan order. The threshold t[m,n] in the threshold matrix 12 has a constant value, e.g., 0.5, for all m, n. The error weighting matrix 16 uses four non-zero weights w[0,1]=7/16, w[1,−1]=3/16, w[1,0]=5/16, and w[1,1]=1/6 which are used to diffuse the error as shown in FIG. 2. FIG. 2 is a diagram 20 showing the distribution of the error, where the current pixel 22 being processed is indicated by a "P."

The conventional error diffusion system 10 has long been known to produce smooth and sharp halftone images. FIG. 3 is a gray level halftoned image 30 generated using the conventional error diffusion system 10. The image 30 of FIG. 3 ranges from full black, i.e., a tone of 1, to full white, i.e., a tone of 0 (if using absorptance). As can be seen in FIG. 3, system 10 generates visible artifacts, such as worms 32, 33 in the highlight and shadow areas and structured patterns 34, 36, and 38 in the mid-tone areas.

Many error diffusion variations and enhancements have been developed to improve the halftone quality. For example, some error diffusion systems modify the thresholds by replacing the fixed threshold with an ordered threshold matrix or by using a matrix which has sparse threshold values along one of its diagonals, the direction of the diagonal being perpendicular to the prevailing direction of worm artifacts. One method described in J. Sullivan, R. Miller and G. Pios, "Image Halftoning Using a Visual Model In Error Diffusion," J. Opt. Soc. Am. A, Vol. 10, No. 8, pp. 1714–1724, August 1993, which is incorporated herein by reference, determines the quantizer threshold with past outputs using a visual system model that is incorporated directly into the architecture of the error diffusion system. The architecture in the system described by Sullivan et al., is complex because of extra filters used for the visual system model, which requires additional computation.

Some error diffusion methods use variable error weights, including randomly dithering filter weights and using an LMS algorithm in adaptive signal processing to adjust the weights for minimizing an error criterion. Other methods of error diffusion, discussed in B. W. Kolpatzik and C. A. Bouman, "Optimized Error Diffusion for Image Display," Journal of Electronic Imaging 1(3), 277–292, July 1992, and P. W. Wong and J. P. Allebach, "Optimum Error Diffusion Kernel Design," Proceedings of SPIE/IS&T Symposium on Electronic Imaging, invited paper, San Jose, Calif., January 1997, both of which are incorporated by reference, use an optimum error-weighting design based on visual modeling. These methods, however, do not optimize the weight set in a tone-dependent manner.

Current error diffusion methods, however, require extensive processing and result in undesirable visual artifacts and/or a poor quality image relative to direct binary search halftoning.

What is needed is an efficient halftoning method that provides a high quality image.

SUMMARY

An efficient haltoning system uses a tone dependent error diffusion halftoning method with tone dependent thresholds and error weightings that are optimized by minimizing a model based cost function. For each midtone level, a halftone image is generated by a direct binary search method and an error diffusion method. The magnitudes of the fast Fourier transforms of the halftone images are compared using a visual cost function and the thresholds and error weightings are altered to minimize the cost function. For highlight and shadow tone levels, the halftone image from the error diffusion system is compared to the continuous tone image after filtering the images via a human visual system model. Again by minimizing the cost function, the thresholds and error weightings are optimized. Once the threshold and error weightings are optimized, they may be maintained in a look-up table. Thus, a tone dependent error diffusion system in accordance with the present invention efficiently processes an image while producing high quality images. Because no additional filters are used on the error diffusion architecture, there is no additional computation required.

The tone dependent error diffusion halftoning method uses an upper and lower threshold to compare with the modified pixel value. If the modified pixel value is greater than the upper threshold, a dot is printed, if less than the lower threshold, no dot is printed, and if between, a binary bitmap is used to determine whether a dot should be printed.

Further, in an embodiment of the present invention for a conventional raster scan and a 2-row serpentine scan, the area that the error is diffused over is varied according to the input pixel value. Thus, if the input pixel value is at an extreme of the tone range, e.g., in the highlight or shadow tone levels, the error is diffused over a large area. If however, the input pixel value is in the midtone region, the error is diffused over a smaller area. A transitional tone region may be also be used, in which case the error is diffused over an area larger than the midtone diffused area but smaller than the highlight/shadow tone area. Further, if in a binary region where the input pixel value is either all on or all off, i.e., 1 or 0, the entire error may be diffused vertically or diagonally if a conventional raster scan is used.

To avoid start-up artifacts, the pixel values may be modified by adding random noise with variance equal to that of the average modification term.

BRIEF DESCRIPTION OF THE DRAWINGS

FIGS. 19A, 19B, and 19C show the probability density functions of the modification term c[m,n;a] for different input pixel values.

FIG. 20 shows the mean value of the modification term c[m,n;a].

DETAILED DESCRIPTION

Figure 4:
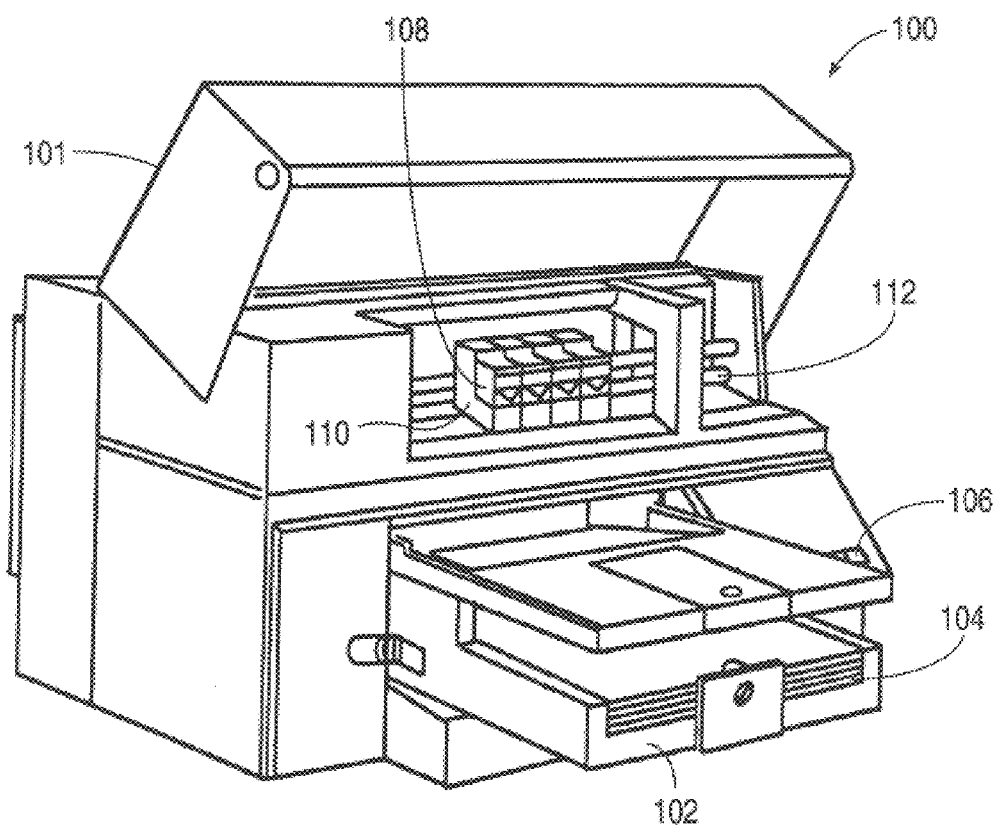
FIG. 4 illustrates a color inkjet printer which includes processing circuitry for performing all or part of the preferred error diffusion method.

FIG. 4 illustrates one type of inkjet printer 100 which includes processing circuitry for performing all or part of the error diffusion method described herein. The inkjet printer includes a cover 101, a paper tray 102 for holding virgin paper 104, an output tray 106 for receiving the printed pages, ink print cartridges 108, and a scanning carriage 110 for sliding along a slide bar 112 while dots are being printed on the paper. In one embodiment, the inkjet printer is a color printer using color print cartridges 108 including cyan (C), magenta (M), yellow (Y), and black (K) ink print cartridges. Other combinations of ink, such as CMY, or a single color ink, such as black (K) may also be used. Further, a separate print cartridge need not be provided for each color ink; a single replaceable print cartridge may include two or more colors of ink with an associated array of ink ejection nozzles for each color. Also, the ink supply for each of the scanning printheads may be stationary and connected to the printheads by a tube. Inkjet print cartridges in inkjet printers are well known to those of ordinary skill in the art. U.S. Pat. No. 5,594,481, entitled "Ink Channel Structure for Inkjet Printhead," to Brian J. Keefe et al., describes the structure of a suitable inkjet print cartridge and is incorporated herein by reference.

Figure 5:
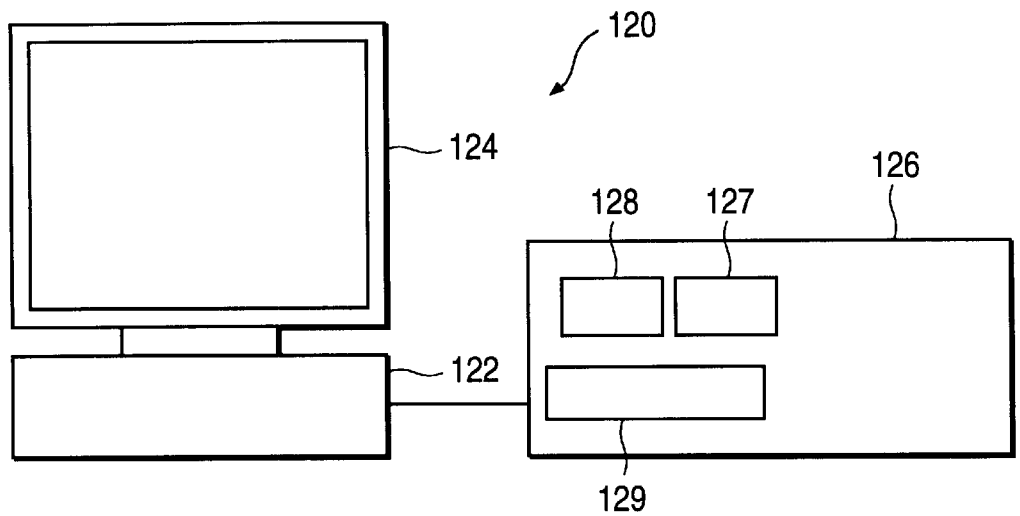
FIG. 5 illustrates a computer connected to an inkjet printer, where the computer or the printer or both carry out the error diffusion method in accordance with the present invention.

FIG. 5 is a schematic diagram of a printing system 120 which includes a host computer 122, a monitor 124 (e.g., a CRT), and a printer 126. Printer 126 could be any type of printer that prints black and/or color dots, including an inkjet printer. Printer 126 includes print cartridge 127, which scans across a medium and prints droplets of ink as described below. Additional print cartridges 128 may also be included in printer 126, for example, to provide different color inks. One or both of print cartridges 127, 128 may include multiple inks. Printer 100 of FIG. 4 may be substituted for printer 126 of FIG. 5. Printer 126 includes a printer controller 129 for controlling the printing of dots by print cartridges 127, 128. The print cartridges 127, 128 may print at 300 dots-per-inch (DPI), 600 DPI, or any other resolution.

Figure 6:
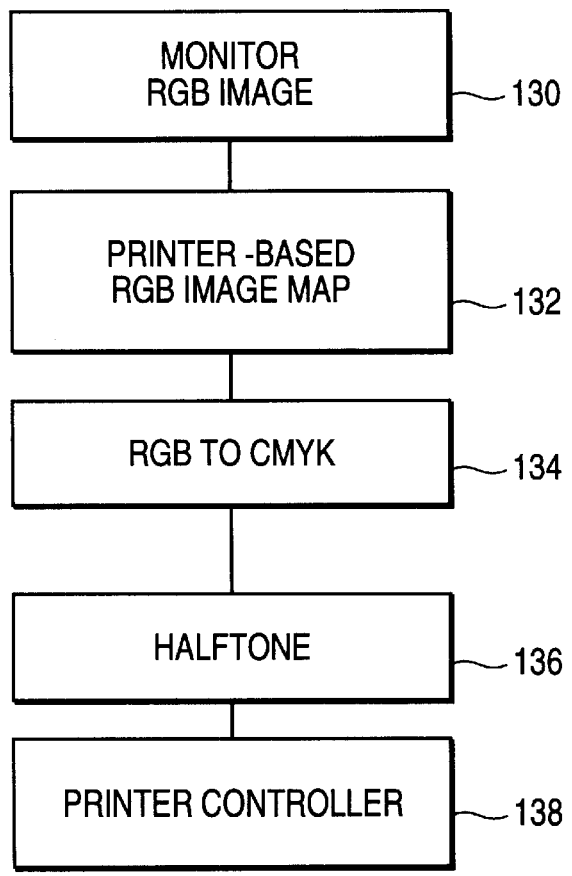
FIG. 6 illustrates the general method performed by the computer and printer of FIG. 5.

FIG. 6 illustrates the standard flow of image information from computer 122 to printer 126. An image is first created or introduced into the memory of computer 122. In order to be displayed on the computer monitor 124, this image is typically represented in additive RGB color space. Each pixel location on the screen can be illuminated in red, green, and blue at any one of 256 (0 to 255) levels of intensity or tones. It takes 8 bits to represent 256 levels ($2^8$=256). Each of the three primary colors require 8 bits; therefore, RGB color monitors are commonly referred to as producing 24-bit color (3×8=24). This image is represented at the spatial resolution of the particular monitor. Typical monitors have 75 pixels per linear inch (75 DPI) in the vertical and horizontal directions.

At step 130, the 24-bit RGB color image is held in the memory of computer 122 so that it can be displayed on monitor 124.

At step 132, the image in memory is converted to a 24-bit RGB image at the resolution of the printer. Typical inkjet printers have a resolution of 300, 600 or 1200 dots per inch. Although the printer typically prints in CMY or CMYK subtractive colors, it is nevertheless convenient for image processing purposes at step 132 to consider the printer to be an RGB device. This is because later translating the color monitor RGB values directly to CMY will usually produce a colorimetric match. However, not all of the matching values will produce the same image quality. Some choices will contain more visual noise than others, while other choices may lead to undesirable discontinuities in the halftone transitions of an image.

At step 134, the printer RGB color image is converted into CMY color space using a look-up table or other conventional means of conversion. Of course, the RGB color image may be converted to CMYK color space in a similar manner.

In step 136, the CMY image is halftoned to convert the image from 3-plane (CMY), 8-bits per color to 3-plane binary color (on or off dots) at the DPI resolution of the printer. In other words, the color and tone (0 to 255) at each pixel location is converted into a pattern of on or off C, M, or Y dots (0 or 255 intensity) to be printed. This halftoned image (which may be a portion of the total image) is stored in a memory. Step 136 is described in greater detail later.

At step 138, the halftone image is transmitted to the printer, typically using efficient communication techniques such as using escape sequences like those identified in Hewlett-Packard Company's Printer Control Language (PCL). The image produced at step 136 includes all of the information about how many dots of each color are to be printed at each pixel location on the page and the locations of the dots. The printer controller 129 (FIG. 5) decides when these dots should be printed.

It will be understood that, depending on the printer, the functions discussed in relation to FIG. 6 can be performed by the host computer (programmed to carry out the processing functions) or by the printer. For example, in a "smart" printer, steps 132 through 138 could all be performed in the printer. On the other hand, to save memory costs in the printer, all or part of the functions 132 through 138 could be performed in the host computer.

Tone Dependent Error Diffusion

The halftoning step 136 is now described in detail with reference to the remaining figures. Thus, it is assumed that step 134 of FIG. 6 has been completed, and the step of halftoning must now be performed.

Because an efficient method of halftoning is desired, error diffusion halftoning is used in accordance with the present invention. However, it is desirable for the error diffusion halftoning method to produce images with superior quality, similar to that of iterative, i.e., direct binary search, approaches to halftoning. Consequently, tone dependent error diffusion halftoning is used with the tone dependent thresholds and error weights optimized based on mimicking the textures produced by direct binary search.

Figure 7:
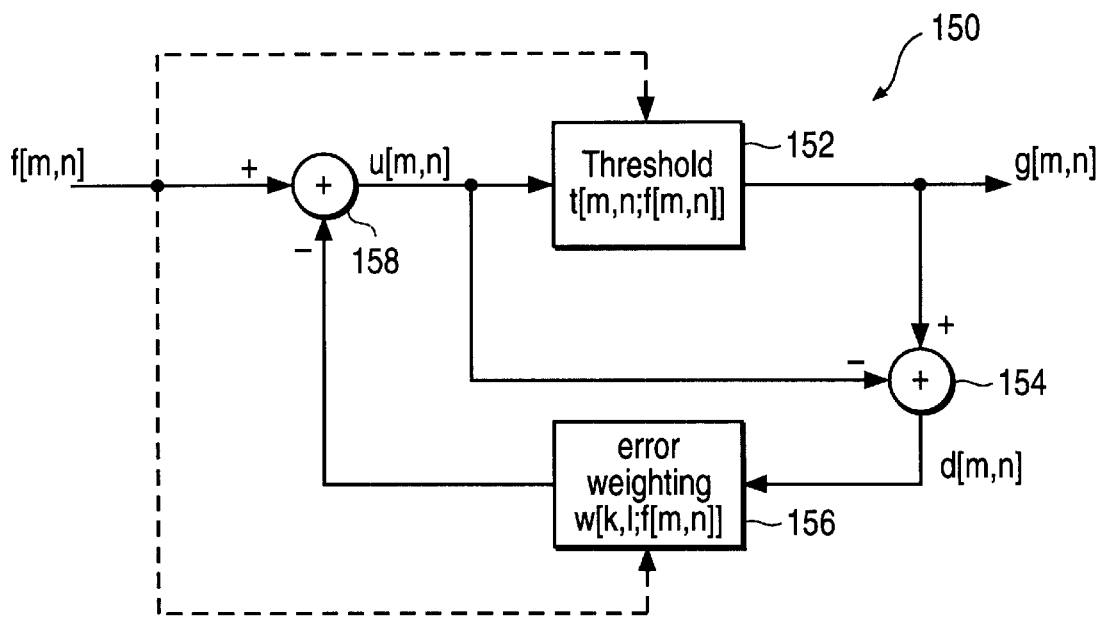
FIG. 7 is a diagram of a tone dependent error diffusion halftoning system in accordance with an embodiment of the present invention.

FIG. 7 is a tone dependent error diffusion halftoning system 150 that produces a halftone image with quality similar to that of direct binary search, in accordance with an embodiment of the present invention. The input pixel value, which has continuous-tone value, is represented as f[m,n], where m and n are the pixel locations. The tone dependent error diffusion system uses an error-weighting matrix 156 and a threshold matrix 152, denoted by w[k,l;f[m,n]] and t[m,n;f[m,n]], respectively, that are functions of the input pixel value f[m,n].

As shown in FIG. 7, the modified pixel value is represented by u[m,n] and the output halftone value is represented by g[m,n], which is determined by a thresholding operation as follows:

$$g[m,n] = \begin{cases} 1, & \text{if } u[m,n] \geq t[m,n,f[m,n]], \\ 0, & \text{otherwise,} \end{cases} \quad \text{equ. 7}$$

where t[m,n;f[m,n]] is the threshold matrix 152 that is tone dependent, i.e., dependent on the input pixel value f[m,n].

The quantizer error d[m,n] is determined by subtracting the modified pixel value u[m,n] from the output halftone value g[m,n] at adder 154 as follows:

$$d[m,n] = g[m,n] - u[m,n]. \quad \text{equ. 8}$$

The quantizer error d[m,n] is then diffused to neighboring, subsequently processed pixel locations.

The input pixel value f[m,n] is updated, via adder 158, to modified input value u[m,n] as follows:

$$u[m+k,n+1] \leftarrow u[m+k,n+1] - w[k,l;f[m,n]]d[m,n], \quad \text{equ. 9}$$

where w[k,l;f[m,n]] is the error-weighting matrix 156 that is tone dependent, i.e., dependent on the input pixel value f[m,n].

The threshold matrix used in the present tone dependent error diffusion system 150 in accordance with the present invention is based on a binary direct binary search pattern with an absorptance of 0.5, i.e., mid-tone, accordingly:

$$t[m,n;a] = \begin{cases} t_u(a), & \text{if } p[m,n;0.5] = 0 \\ t_l(a), & \text{otherwise,} \end{cases} \quad \text{equ. 10}$$

where t[m,n;a] is the threshold matrix, $t_u(a)$ and $t_l(a)$ are tone dependent parameters satisfying $t_u(a) \geq t_l(a)$, "a" is the tone value of the pixel being processed, and p[m,n;0.5] is a halftone pattern generated by a direct binary search halftoning method that represents a constant patch with absorptance 0.5.

Figure 8:
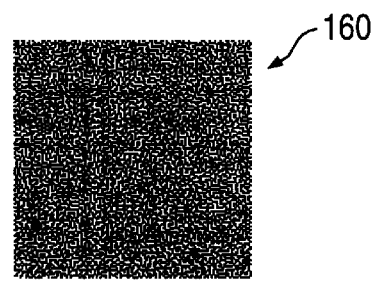
FIG. 8 shows a binary bitmap pattern with an absorptance of 0.5 generated by a direct binary search halftoning method.

FIG. 8 shows an example of a direct binary search generated halftone bitmap pattern 160 with an absorptance of 0.5, that may be used as p[m,n; 0.5]. The bitmap pattern 160 of FIG. 8 is doubly periodic in m and n with period M:

$$p[m+kM, n+lM; 0.5] = p[m,n; 0.5], \quad \text{equ. 11}$$

where k and l are integers, and M is the size of the halftone pattern. Therefore, the ideal threshold matrix t[m,n;a] is also a periodic function with period M. Thus, bitmap 160 in FIG. 8 may be tiled over an image.

By substituting equation 10 into equation 7, thresholding matrix 152 of the present tone dependent error diffusion halftoning process is represented by:

$$g[m,n] = \begin{cases} 1, & \text{if } u[m,n] \geq t_u(f[m,n]), \\ 0, & \text{if } u[m,n] < t_l(f[m,n]), \\ p[m,n; 0.5], & \text{otherwise.} \end{cases} \quad \text{equ. 12}$$

Thus, as shown in equation 12, the parameters $t_u$ and $t_l$ serve as upper and lower thresholds, respectively, in the threshold matrix 152. If the modified pixel value u[m,n] is greater than or equal to the upper threshold $t_u$, the output pixel value g[m,n] is set to 1; if the modified pixel value u[m,n] is less than the lower threshold $t_l$, the output pixel value g[m,n] is set to 0; otherwise, the threshold is modulated by using the pixel value at the same location, i.e., m and n, in the direct binary search bitmap pattern 160 shown in FIG. 8 as the output pixel value g[m,n]. Bitmap 160 may be tiled so that it is as large or larger than the image being processed.

If the upper and lower thresholds $t_u$ and $t_l$ are identical, the threshold modulation with the use of bitmap pattern 160 may be eliminated. In another embodiment, the threshold modulation of equation 12 is replaced with a screening process, for example using a direct binary search screen, where the tone values for the pixel are compared to a screen, i.e., a matrix of threshold values. If the pixel has a tone value greater than the corresponding matrix threshold value the pixel is binarized to 1; otherwise it is binarized to 0.

Figure 9:
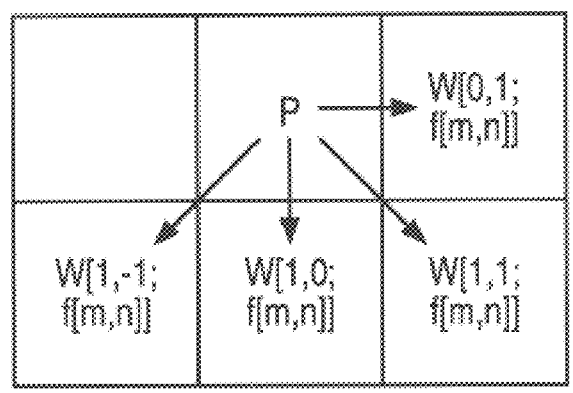
FIG. 9 is a diagram showing the distribution of the error in the tone dependent error diffusion system of FIG. 7.

The tone dependent error diffusion system 150 uses a serpentine scan. Of course, if desired other types of scans, such as raster or a 2-row serpentine scan may be used as will be discussed later. With the serpentine scan, every other row is processed from left to right and the error is diffused according to the tone dependent error weightings shown in FIG. 9. FIG. 9 is a diagram 20 showing the distribution of the error, where the current pixel 162 being processed is indicated by a "P." The in-between rows are processed from right to left using the mirror image of FIG. 9.

The upper and lower thresholds, $t_u$ and $t_l$, respectively, as well as the error weighting must be optimized for different tone levels. Optimization of the thresholds and error weights is accomplished with a cost function that measures the quality of the halftone image.

Because it is desirable for the error diffusion halftoning method to produce images with quality similar to that of direct binary search halftoning methods, it is useful to briefly examine direct binary search halftoning and the perceived error between the halftone image generated by direct binary search and the continuous-tone image.

Direct binary search is an iterative halftoning method that uses a human visual system model to minimize the perceived error between the halftone image and the continuous-tone image.

The human visual system model is a linear shift-invariant low pass filter. The frequency response of this filter is given by:

$$H(u, v) = \exp\left[-\left(\frac{180}{\pi}\right)\frac{\sqrt{u^2 + v^2}}{c \ln(L) + d}\right] \quad \text{equ. 13}$$

where u and v are the spatial frequency variables in cycles/radian, L is the average luminance, which has a value of 10 cd/m$^2$, c=0.525, and d=3.91. The point spread function h(x,y) is obtained by taking the inverse Fourier transform of H(u,v). Because a length x when viewed at a distance D subtends at an angle of $\tan^{-1}$ (x/D)≈x/D for x<<D, the human visual system filter with units measured on the printed media can be computed as $\tilde{h}(x,y)$=h(x/D,y/D), where D is set equal to 11 inches.

Let e[m,n] denote the error image, i.e., the difference between the continuous-tone image and the halftone image, where e[m,n] is obtained by:

$$e[m, n]=f[m,n]-g[m,n]. \quad \text{equ. 14}$$

Then the perceived error between the halftone image and the continuous-tone image is represented as $$\tilde{e}(x, y) = \sum_m \sum_n e[m, n]\tilde{h}(x - mX, y - nX), \quad \text{equ. 15}$$

where X corresponds to the lattice of addressable points of the output device, i.e., the positions at which the printer can actually place dots of ink.

The error metric, which is used as the cost function by direct binary search, is the total perceived squared error given by:

$$E=\int\int|\tilde{e}(x,y)|^2 dxdy. \quad \text{equ. 16}$$

where x=1/300. By substituting equation 16 into equation 15, the error metric E, i.e., the cost function, can be computed as $$E = \sum_m \sum_n e[m, n]c_{\tilde{h}\tilde{e}}[m, n], \quad \text{equ. 17}$$

where $c_{\tilde{h}\tilde{e}}[m,n]$ is the cross-correlation function between $\tilde{h}(x,y)$ and $\tilde{e}(x,y)$ evaluated at discrete points.

Direct binary search uses an iterative E. The method starts with an initial halftone image which can be obtained, for example, by error diffusion system 10 or by conventional screening. For each pixel of the halftone image, the impact of toggling the pixel or swapping its value with one of its eight nearest neighbors is evaluated. If any change reduces the error, the change which gives the greatest decrease in the error is accepted. The process is iteratively repeated on the halftone image until no change is accepted.

In order to search for the optimal error weights and thresholds for the present tone dependent error diffusion system 150, a visual cost function that measures the quality of the halftone image is necessary. The cost function, i.e., equation 17, used by the direct binary search is one possible choice. It should be understood, of course, that if desired equation 16 may be used as the cost function.

However, while the perceived error, used in the direct binary search method, can generally indicate the smoothness of the binary texture, it cannot measure the texture variety and homogeneity of the image. Minimizing the global perceived error of an error diffusion system leads to some very inhomogeneous textures especially for the mid-tones.

Figure 10A:
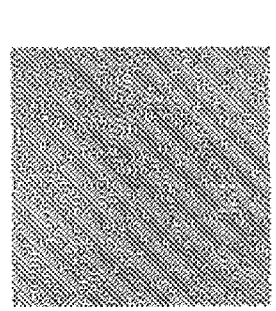
FIGS. 10A and 10B are binary patterns representing a patch with absorptance of 87/255 generated by a conventional error diffusion system and a direct binary search system, respectively.
Figure 10B:
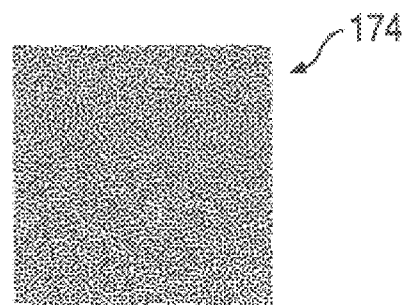

FIGS. 10A and 10B are a conventional error diffusion generated binary pattern 172 and a direct binary search generated binary pattern 174, respectively. Both patterns 172 and 174 represent a continuous patch with an absorptance of 87/255. The perceived total squared error from equation 17 is 0.0084 for the error diffusion pattern 172 and is 0.0103 for the direct binary search pattern 174. Although the error diffusion pattern 172 looks smooth and has a smaller error than the direct binary search pattern 174 as can be seen in FIG. 10A, the error diffusion pattern 172 contains undesirable structured patterns. Thus, minimizing the squared error from equation 17 does not necessarily produce homogeneous textures.

Figure 11A:
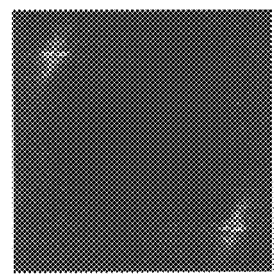
FIGS. 11A and 11B show the magnitude of the fast Fourier transforms of the patterns shown in FIGS. 10A and 10B, respectively.
Figure 11B:
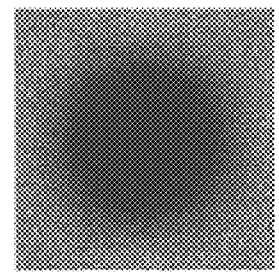

FIGS. 11A and 11B show the magnitude of the 2-D fast Fourier transforms (FFT) of the error diffusion pattern 172 and the direct binary search pattern 174, respectively. FIG. 11B shows that the direct binary search pattern 174 has a texture variety that is uniformly distributed in every direction. FIG. 11A, on the other hand, shows that the energy spectrum for the error diffusion pattern 172 is concentrated on some specific frequencies in a diagonal direction. Thus, the magnitudes from an FFT analysis can be used as an indication of the texture.

Because it is desired that the quality of an image generated by the present tone dependent error diffusion method approach that of an image generated by direct binary search methods, the present tone dependent error diffusion uses the magnitude of the FFT for the direct binary search pattern as an objective spectrum for the halftone patterns in the mid-tones.

Let $G^{DBS}(u,v)$ and $G^{TDED}(u,v)$ denote the expectation of the magnitude of the FFT of the direct binary search patterns and tone dependent error diffusion patterns, respectively. The total squared error between $G^{DBS}(u,v)$ and $G^{TDED}(u,v)$ is given by:

$$\varepsilon = \sum_u \sum_v [G^{TDED}(u,v) - G^{DBS}(u,v)]^2 \qquad \text{equ. 18}$$

We have empirically determined that the error metric of equation 18 is a better visual cost function than the error metric of equation 17 for the midtones; but that the error metric of equation 17 may be used as the visual cost function for extreme highlight and shadow tone levels, i.e., when the dots or holes are sparse.

In the search for the optimal tone dependent values for the upper and lower thresholds $t_u$ and $t_l$, respectively, and the error weightings that minimize the cost functions of equations 16 and 18, above, the function is subject to the following constraints:

$$t_u(a) + t_l(a) = 1, \qquad \text{equ. 19}$$

$$t_u(a) \geq t_l(a), \qquad \text{equ. 20}$$

$$\sum_{k,l} w[k,l;a] = 1, \qquad \text{equ. 21}$$

$$w[k,l,a] \geq 0 \; \forall k,l. \qquad \text{equ. 22}$$

Constraint 19 above is used so that the threshold matrix 152 has a fixed mean value of 0.5. While constraint 19 states the sum of the upper and lower thresholds is 1, it should be understood that the upper and lower thresholds should be scaled to the value of the highest tone level and, thus, if the tone levels have a range of 0 to 255, the sum of the upper and lower thresholds will be 255. For this particular configuration, the cost function can be treated as a function of $(t_u(a), w[0,1;a], w[1,1;a], w[1,0;a])$ because $t_l(a)$ and $w[1,-1;a]$ can be obtained from constraints 19 and 21. Therefore, a four-dimensional minimization is required. Of course, if desired, the lower threshold $t_l(a)$ may be found and the upper threshold $t_u(a)$ may be obtained from constraint 19. The same is true for finding other error weightings using constraint 21.

Figure 12:
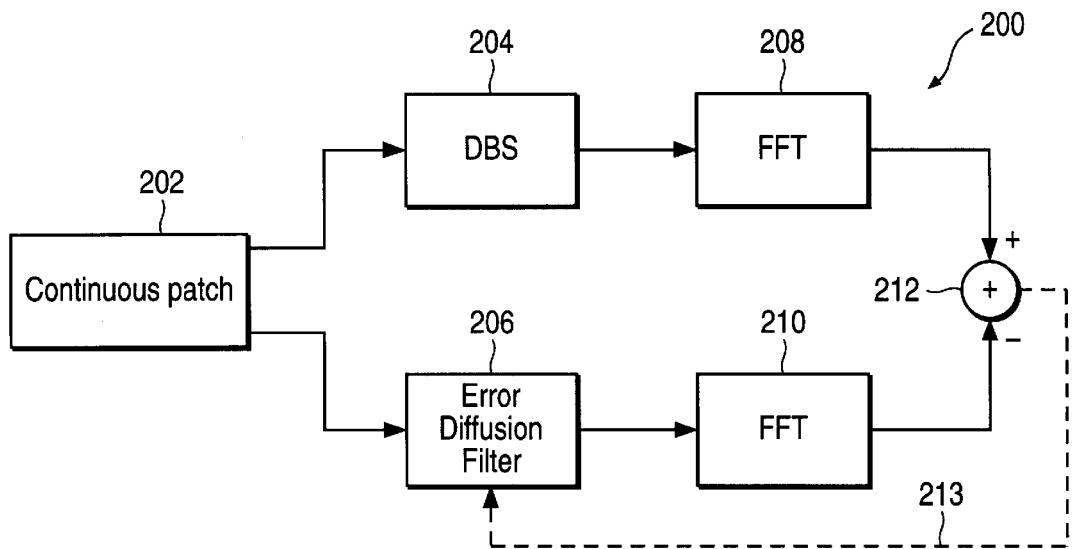
FIG. 12 shows a tone dependent error diffusion training system to obtain optimized thresholds and error weightings in midtones in accordance with an embodiment of the present invention.

FIG. 12 shows a tone dependent error diffusion training system 200 to obtain optimized thresholds and error weightings in midtones in accordance with an embodiment of the present invention. As shown in FIG. 12, a continuous-tone patch 202 for a given tone level is provided and direct binary search filter 204 generates a halftone image of the patch while an error diffusion filter 206 generates another halftone image.

In one embodiment, multiple halftone patterns are generated at direct binary search filter 204 and error diffusion filter 206. For example, fifty 128×128 halftone patterns representing the tone level from the continuous-tone patch 202 are generated using different random initial patterns for the DBS pattern. The magnitude of each direct binary search pattern is computed by fast Fourier transform FFT block 208 and the value of $G^{DBS}(u,v)$ is estimated by taking the average of the magnitudes.

Similarly, a number of error diffusion patterns are generated by error diffusion filter 206. For example, fifty 128×128 halftone patterns with different random start-up conditions are used. To avoid start-up artifacts, each 128×128 halftone pattern should be cropped out from the center part of a sufficiently large binary image. The magnitude of each image is obtained via FFT block 210. The value of $G^{TDED}$ (u,v) is then estimated by taking the average of the fifty magnitude images. After the values of $G^{DBS}(u,v)$ and $G^{TDED}$(u,v) are generated, the cost function $\xi$ is obtained at block 212 using equation 18. The broken line 213 from block 212 to error diffusion filter 206 indicates the process of adjusting the thresholds and weights used in the error diffusion filter 206 to reduce the cost function.

Figure 13:
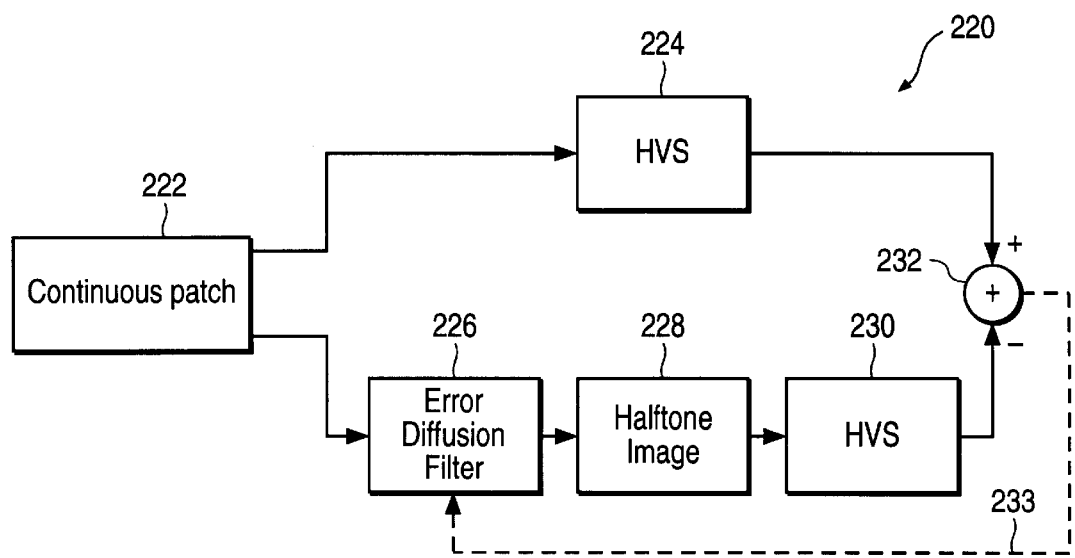
FIG. 13 shows a tone dependent error diffusion training system to obtain optimized thresholds and error weightings in highlight and shadow areas in accordance with an embodiment of the present invention.

FIG. 13 shows a tone dependent error diffusion training system 220 to obtain optimized thresholds and error weightings in highlight and shadow areas in accordance with an embodiment of the present invention. FIG. 13, similar to FIG. 12, provides a continuous-tone patch 222 for a given tone level is provided. For system 220 a 512×512 binary pattern is used. A human visual system model filter 224 is applied to the continuous-tone patch. An error diffusion filter 226 is applied to generate a halftone image 228. A human visual system model filter 230 is then applied to the halftone image. The cost function is then generated by block 232 using equation 17. The broken line 233 from block 232 to error diffusion filter 226 indicates the process of adjusting the thresholds and weights used in the error diffusion filter 226 to reduce the cost function.

Figure 14A:
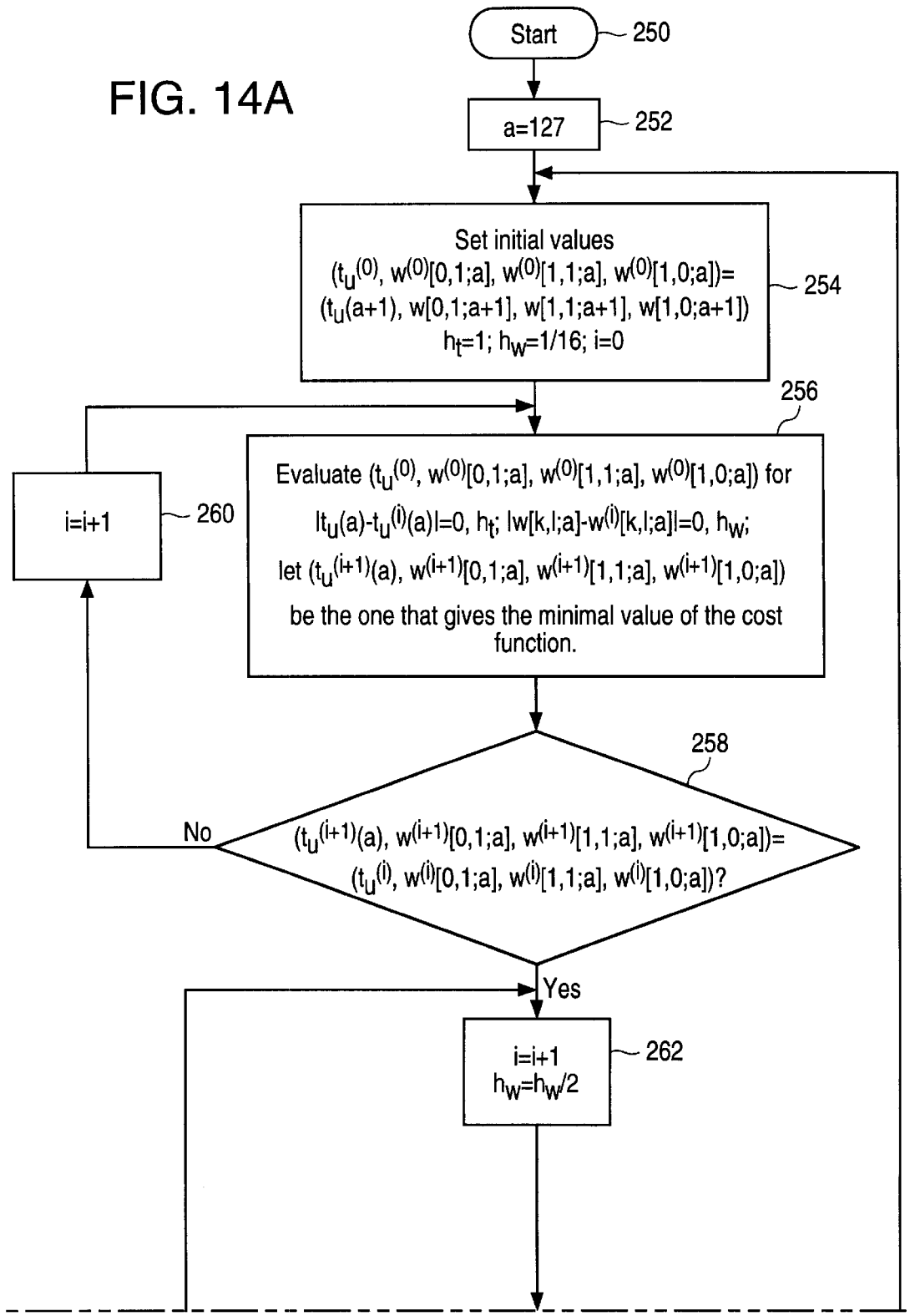
FIG. 14 is a flow chart showing the downhill search method used to obtain the optimized thresholds and error weightings.
Figures 14, 14A, 14B:
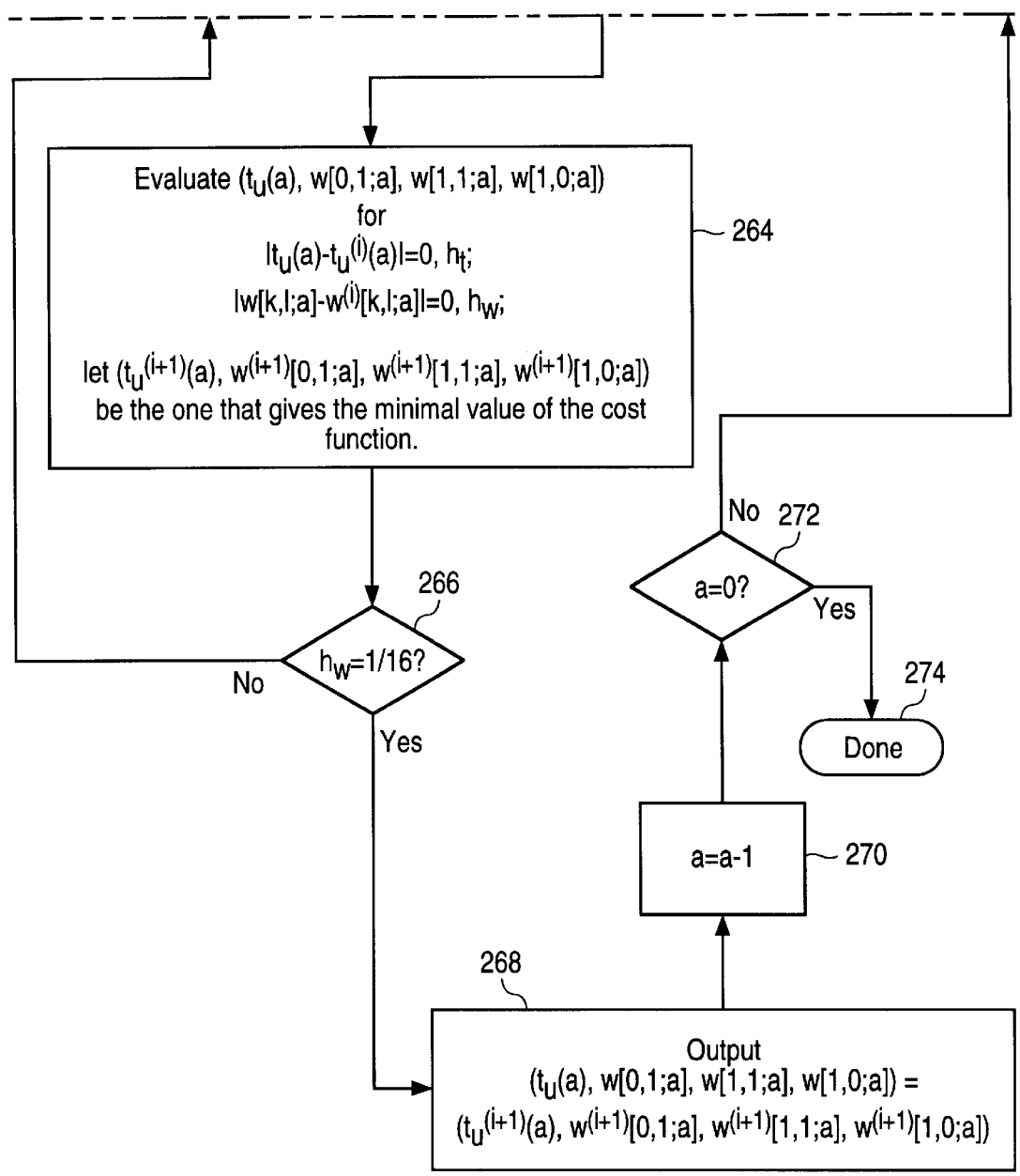

FIG. 14 is a flow chart showing the downhill search method used to obtain the optimized thresholds and error weightings using both FIG. 12, for the midtones, and FIG. 13, for the highlight and shadow areas. The tone dependent error diffusion filter is designed level by level starting from a midtone level. Thus, for example, for a 256-level tone dependent error diffusion filter, where the tone values for each pixel are represented by a tone level index between 0 (white) and 255 (black), the starting midtone level is 127. Of course, if desired, this tone level index may be scaled to be between 0 (white) and 1 (black), e.g., by dividing the tone level by 255. After the optimum thresholds and error weights are obtained for this level, the process proceeds to design the filters for each independent lighter tone level (or darker level).

As shown in the flow chart of FIG. 14, in step 250 the search begins and in step 252 the initial value of a is set at a midtone value, e.g., absorptance=127. In step 254 the upper threshold $t_u^{(0)}(a)$, and the error weightings $w^{(0)}[0,1;a]$, $w^{(0)}[1,1;a]$, $w^{(0)}[1,0;a]$ are set at the optimal values obtained at the last designed tone level. The initial filter for the first designed tone level, e.g., the midtone 127, is chosen to be the conventional error diffusion system 10. The step size $h_w$ is set equal to 1/16 for the error weighting w[k,l;a] and the step size $h_t$ is set equal to 1 for the threshold $t_u(a)$ and the value of i is set equal to 0 in step 254.

In step 256, every possible value (with step sizes defined in step 254) of the upper threshold $t_u(a)$, and the error weightings w[0,1;a], w[1,1;a], w[1,0;a] are evaluated using the system 200 shown in FIG. 12 using the cost function of equation 18 for the midtones, e.g., tone levels 21 to 235, and using the system 220 shown in FIG. 13 using equation 17 for the highlights and shadow areas, e.g., tone levels 0 to 20 and 236 to 255, respectively. The cost functions are evaluated subject to conditions 19 to 22 and subject to $|t(a)-t_u^{(i)}(a)|=0$ or $h_t$, and $|w[k,l;a]-w^{(i)}[k,l;a]|=0$ or $h_w$. Thus, each parameter has the possibility of two values, e.g., $|t_u(a)-t_u^{(i)}(a)|$ is set equal to 0 or $h_t$ and $|w[k,l;a]-w^{(i)}[k,l;a]|$ is set equal to 0 or $h_w$. Because there are four parameters, each with two possible values, there are sixteen permutations. The values used in the permutation that result in the minimal cost function are defined as $t_u^{(i+1)}(a)$, $w^{(i+1)}[0,1;a]$, $w^{(i+1)}[1,1;a]$, $w^{(i+1)}[1,0;a]$.

In step 258 a test is performed to see if in the last iteration there were any changes in the upper threshold value $t_u^{(i+1)}(a)$ or the error weightings $w^{(i+1)}[k,1;a]$. If there were changes in any of these values, i.e., $(t_u^{(i)}(a), w^{(i)}[0,1;a], w^{(i)}[1,1;a], w^{(i)}[1,0;a])$ is not equal to $(t_u^{(i+1)}(a), w^{(i+1)}[0,1;a], w^{(i+1)}[1,1;a], w^{(i+1)}[1,0;a])$ then the value of i is redefined as i+1 in step 260 and the process flows back to step 256. If there were no changes, the process flows to step 262, where i is redefined as 1+1 and $h_w$ is redefined as $h_w/2$.

In step 264, every possible value (with $h_t=1$ and $h_w$ defined in step 262) of the upper threshold $t_u(a)$, and the error weightings w[0,1;a], w[1,1;a], w[1,0;a] are again evaluated similar to step 256.

In step 266, a test is done to determine if the value of $h_w$ is equal to 1/256, which is the minimal step size desired. If the value of $h_w$ is greater than 1/256 the process flows back to step 262. If, however, the value of $h_w$ is equal to 1/256, the process flows to step 268, which outputs the final value of $(t_u(a), w[0,1;a], w[1,1;a], w[1,0;a])$ as equal to the last values of $(t_u^{(i+1)}(a), w^{(i+1)}[0,1;a], w^{(i+1)}[1,1;a], w^{(i+1)}[1,0;a])$ In step 270 the tone value a is redefined as a−1. A test is performed in step 272 to determine if the tone value a is equal to 0. If the tone value a is not equal to 0, the process flows back to step 254. If the tone value a is equal to 0, the process is terminated at step 274.

Due to symmetry, after the lightest tone level is finished, e.g., tone level 0, the optimal thresholds and error weightings for tone levels darker than the midtone level, e.g., tone level 127, can be obtained by $t_u(a)=t_u(255-a)$ and $w[k,l;a]=w[k,l;255-a]$.

FIGS. 15, 16A, 16B, 16C, and 16D show the results of the optimized thresholds and the error weightings w[0,1;a], w[1,−1;a], w[1,0;a], and w[1,1;a], respectively, where the absorptance, threshold values and weight values are scaled from 0 to 1. Once the thresholds and error weightings are optimized, they may be held in a look-up table in threshold matrix 152. The look-up table may be implemented in hardware or software. Thus, tone dependent error diffusion system 150 can efficiently process an image while producing high quality halftone image.

Figure 17:
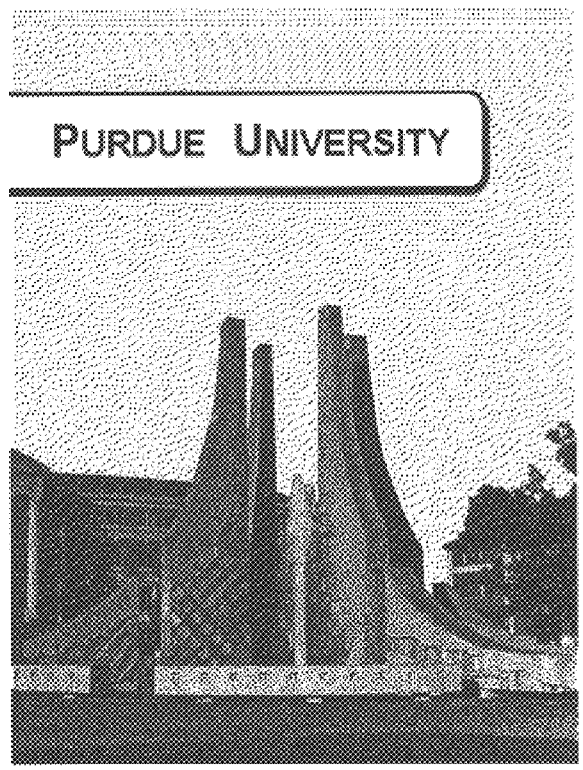
FIG. 17 shows a halftone image generated using a conventional error diffusion system.
Figure 18:
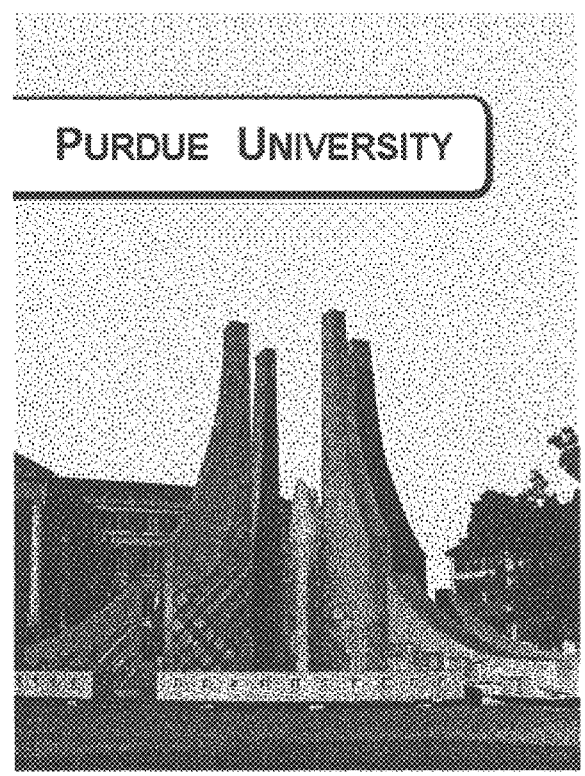
FIG. 18 shows a halftone image generated using the tone dependent error diffusion system using thresholds and error weightings shown in FIGS. 15, and 16A–16D.

FIG. 17 shows a halftone image generated using the conventional error diffusion system 10. FIG. 18 a halftone image generated using the tone dependent error diffusion system 150 using thresholds and error weightings shown in FIGS. 15, and 16A–16D.

Edge Enhancement and Start-up Artifacts

As can be seen in FIGS. 17 and 18, the quality of the highlight and shadow regions, such as the sky area, and the midtone areas have been significantly improved by tone dependent error diffusion system 150. However, as can be seen in FIG. 18, there remain a few visual artifacts, such as the start-up delay at the top of the image. Further, both images in FIGS. 17 and 18 are sharpened due to the inherent edge enhancement characteristics of error diffusion. The edge enhancement, for example, can be observed on the building structures and the patterns carved on the sculpture in the center of the images in FIGS. 17 and 18. Thus, it is desirable to modify the tone dependent error diffusion system 150 to reduce artifacts such as edge enhancement and start-up defects.

In accordance with one embodiment of the present invention, the tone dependent threshold matrix 152 is modified using the probability characteristics of the modification term c[m,n], as defined by equation 5.

Using the conventional error diffusion system 10 as an example, the input to the threshold matrix 12 is the modified pixel u[m,n] given by equation 5 above. The expectation value of the output E(g[m,n]) is:

$$E(g[m, n]) = 0P(u[m, n] < t[m, n]) + 1P(u[m, n] \geq t[m, n]) \quad \text{equ. 23}$$

$$= P(c[m, n] \leq f[m, n] - t[m, n]).$$

The modification term c[m,n] can be treated as a random variable that is calculated based on past errors. Let c[m,n;a] denote this random variable for a constant input image with absorptance a. The expectation output for this image is then:

$$E(g[m, n])=P(c[m, n; a] \leq a - t[m, n; a]), \quad \text{equ. 24}$$

where t[m,n;a] is the threshold matrix 152 used in the tone dependent error diffusion system 150 of FIG. 7. Suppose there is a change in this constant input image at some location (m,n) and the new pixel value is b. At this location, the modification term c[m,n;a] is calculated using the past errors; and the threshold matrix to be used is based on the current pixel value b. According to equation 23, the expectation of the output pixel value g[m,n] is given by:

$$E(g[m,n])=P(c[m,n;a] \leq b - t[m,n;b]). \quad \text{equ. 25}$$

If no sharpening or blurring is expected, where the term "no sharpening or blurring" means that "the expectation of the output value does not depend on the neighboring input values," the expectation of equation 25 above should be the same as when the image has constant pixel value b.

$$P(c[m,n;a] \leq b - t[m,n;b])=P(c[m,n;b] \leq b - t[m,n;b]). \quad \text{equ. 26}$$

Equation 26 holds true if c[m,n;a] and c[m,n;b] have identical probability distributions at pixel location (m,n). In general, if the probability distribution of the modification term does not change when the neighboring input values change, no sharpening or blurring will occur.

FIGS. 19A, 19B, and 19C show that the probability density functions (pdf) of c[m,n;a] are different for different input pixel values, i.e., input values 7/255, 63/255, and 127/255, respectively.

In order to reduce the dependence on the probability density for c[m,n;a] on input pixel value a, we examine the effect of modifying the threshold matrix t[m,n;a]. For any fixed pixel value a, it can be shown that shifting the threshold matrix by a constant $t_0$ will not affect the texture in the halftone but will shift the probability density for c[m,n;a] by the amount $t_0$. Thus, we can line up the probability distribution for c[m,n;a] for all values of a without affecting the resulting halftone texture. This will reduce the dependence of these distributions on a, but not eliminate it entirely because the shape of the probability density will still depend on a.

A threshold matrix that reduces the edge enhancement effect is given by:

$$t[m,n;a] \leftarrow t[m,n,a]+E(c[m,n;a]), \quad \text{equ. 27}$$

so that the modification term c[m,n;a] has the same mean value 0 for any input value a. FIG. 20 shows the mean value of the modification term c[m,n;a], where the absorptance is on a scale of 0 to 1.

For the tone dependent error diffusion method in accordance with the present invention, the high and low thresholds $t_u(a)$, $t_1(a)$ are modified accordingly:

$$t_u(a) \leftarrow t_u(a)+E(c[m,n; a])$$

$$t_1(a) \leftarrow t_1(a)+E(c[m,n; a]). \quad \text{equ. 28}$$

Figure 15:
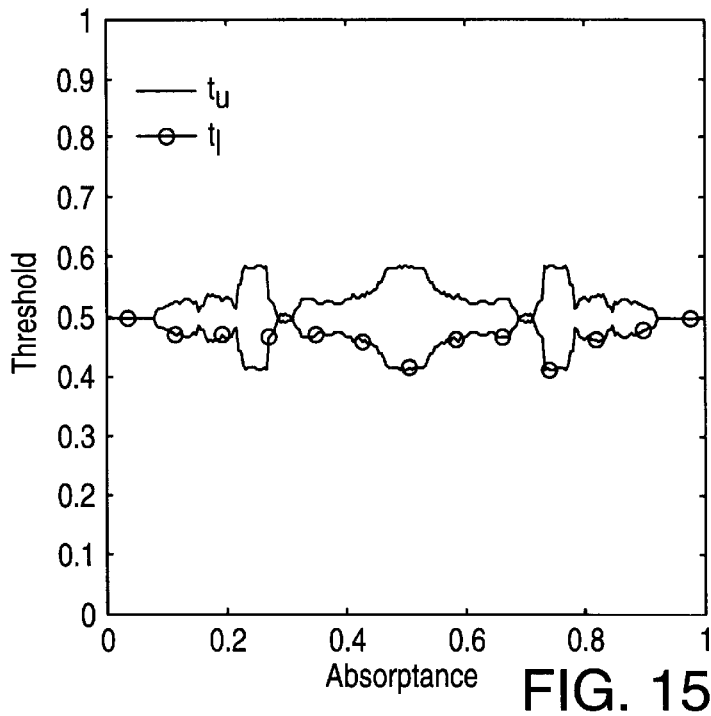
FIG. 15 shows the results of the optimized thresholds in accordance with an embodiment of the present invention.
Figure 16A:
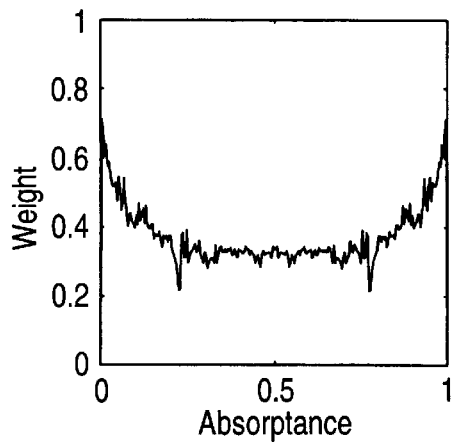
FIGS. 16A, 16B, 16C, and 16D show the results of the optimized error weightings w[0,1;a], w[1,−1;a], w[1,0;a], and w[1,1;a], respectively, in accordance with an embodiment of the present invention.
Figure 16B:
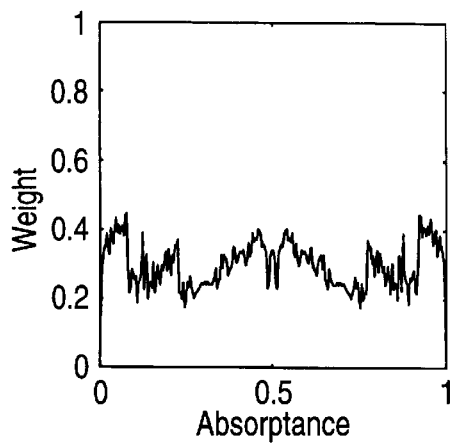
Figure 16C:
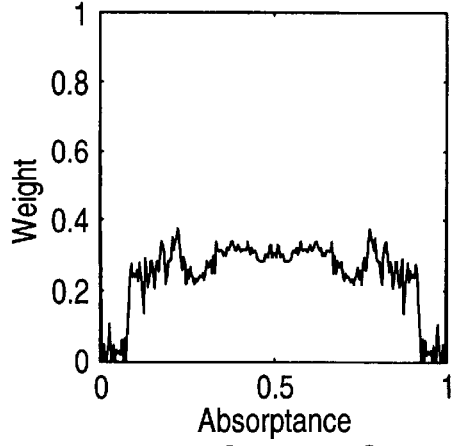
Figure 16D:
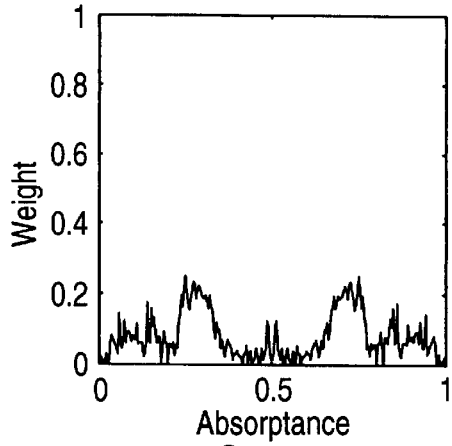
Figure 21:
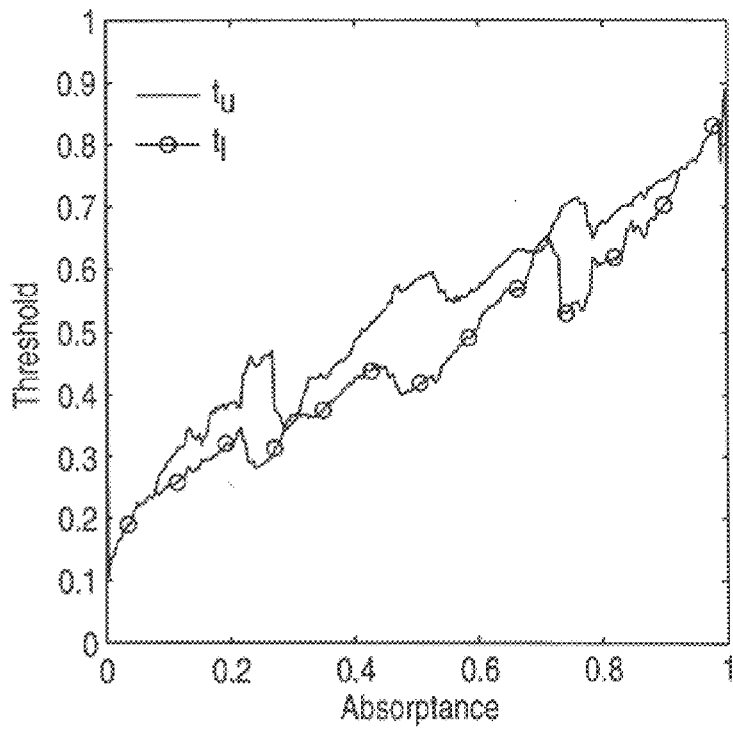
FIG. 21 shows the upper and lower tone dependent thresholds from FIG. 15 modified by the modification term from FIG. 20.

FIG. 21 shows the upper and lower tone dependent thresholds $t_u(a)$ and $t_1(a)$, from FIG. 15, modified by the modification term E(c[m,n;a]), from FIG. 20.

Figure 22:
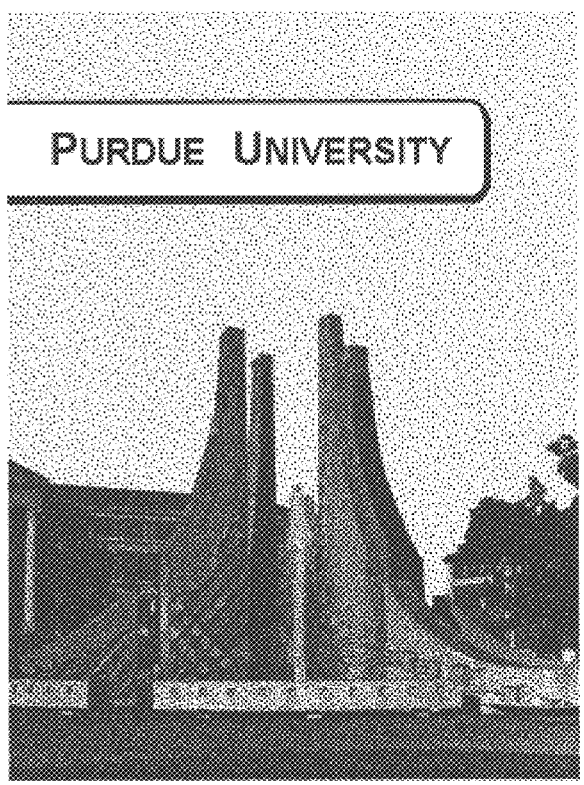
FIG. 22 shows a halftone image generated in accordance with an embodiment of the present invention using the modified upper and lower tone dependent thresholds shown in FIG. 21.

FIG. 22 shows a halftone image, similar to that shown in FIGS. 17 and 18, except the halftone image shown in FIG. 22 was generated in accordance with an embodiment of the present invention using the modified upper and lower tone dependent thresholds $t_u(a)$ and $t_1(a)$ shown in FIG. 21. As shown in FIG. 22, the edge enhancement and start-up artifacts have been reduced using the modified upper and lower tone dependent thresholds $t_u(a)$ and $t_1(a)$.

One type of displeasing start-up artifact pattern is the structured pattern found at the top of the image shown in FIG. 18 caused because there is no error being diffused from previous lines. To reduce this type of artifact, a modification term $\bar{c}[m,n]$ is added to each input pixel value $f[m,n]$ of the first scan line of the image.

To obtain the modification term $\bar{c}[m,n]$, first the average of the variances of the probability density functions of $c[m,n;a]$ for all tone levels is generated, and which is equal to 0.0231. The modification term $\bar{c}[m,n]$ is then defined to be a random variable with uniform distribution in the interval $[-0.2635, 0.2635]$, which has a mean value 0 and variance 0.0231. The random variable $\bar{c}[m,n]$ may be generated using a random number generator or by using precomputed random numbers stored in a look-up table. It should be understood that the use of "random" herein includes pseudo random, as is well understood in the art. Using such a random variable improves the quality at the top of the halftone image as shown in FIG. 22.

Another type of start-up artifact can be found right below the "Purdue University" text box in FIG. 18. Because this region is binary, i.e., the border of the text box is completely dark and the background in the interior is completely white, this region generally does not generate new quantizer errors or compensate the past errors. The low pass characteristics of the error-weighting matrix tends to average the past quantizer errors when propagating them. Therefore, the errors become nearly constant along the bottom of the text box. Consequently, there are start-up artifacts after the text box when the quantization process is continued.

Figure 23:
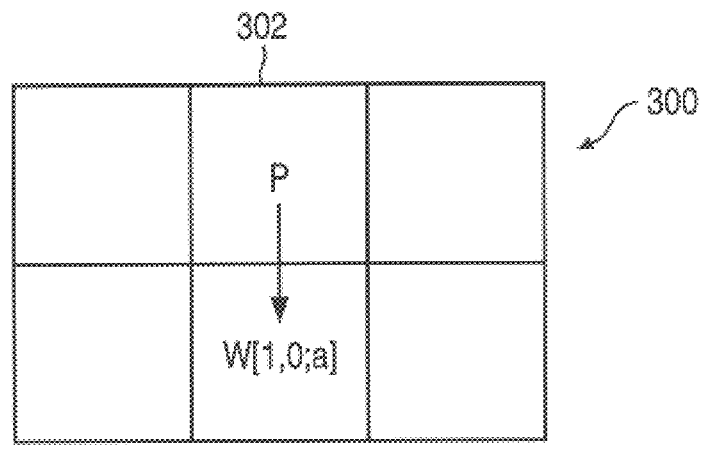
FIG. 23 is a diagram showing the distribution of the error in the vertical direction in regions with absorptance 0 or 1.

Start-up artifacts that occur after a text box in an image, such as that shown in FIG. 18, can be reduced by using a special case filter for black and white tones, i.e., tones of 0 or 1 (255). The error weighting matrix for the special case filter uses one non-zero weight $w[1,0;a]=1$ that is diffused directly below the pixel being processed, as shown in FIG. 23. FIG. 23 is a diagram 300 showing the distribution of the error in the vertical direction, where the current pixel 302 being processed is indicated by a "P." Thus, the quantizer errors are propagated in the vertical direction so that the errors are not averaged in the all black (or all white) areas. FIG. 22 shows the result of using this type of filter.

As can be seen in FIG. 18, another artifact that may be generated with a text box are black dots appearing in the white area near the top of the text box. These dots appear because the modified pixel values at those locations exceed the thresholds. To eliminate this type of artifact, it is necessary to find the range of the modification term $c[m,n]$.

Figure 1:
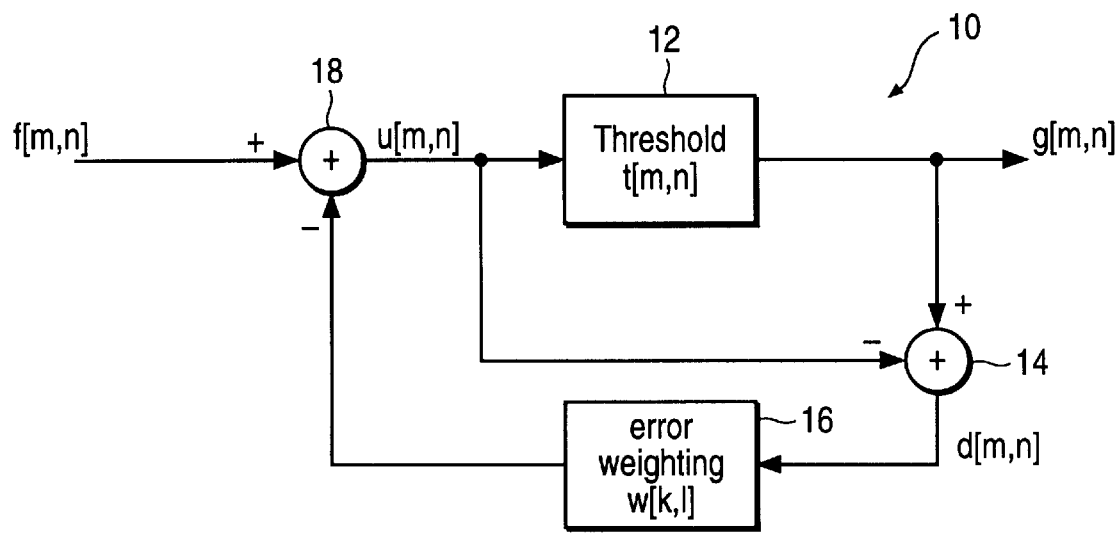
FIG. 1 is a diagram of a conventional error diffusion system.
Figure 2:
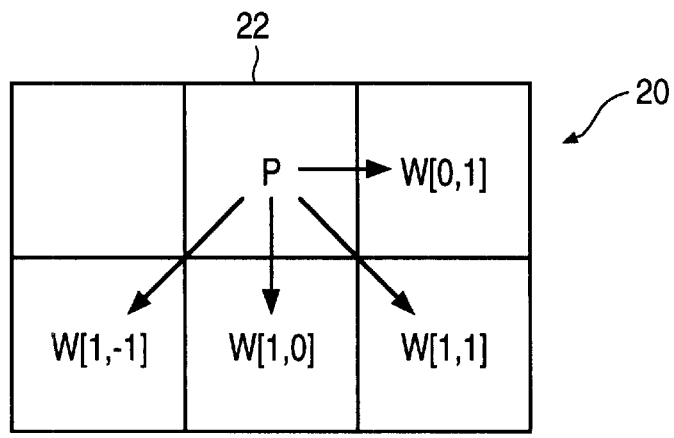
FIG. 2 is a diagram showing the distribution of the error in a conventional error diffusion system.

For the conventional error diffusion system 10, shown in FIG. 1, the modification term $c[m,n]$ is bounded by $$-\max_{m,n} t[m,n] \leq c[m,n] \leq 1 - \min_{m,n} t[m,n],$$ equ. 29 where $$\sum_{k,l} w[k,l] = 1$$

However, equation 29 is not true in a tone dependent error diffusion system with variable error weights because, in general, $$\Sigma w[k,l;f[m-k,n-1]] \neq 1,$$ equ. 30 when the image does not have a constant tone (if the image had a constant tone $f[m,n]==a$, the weights will sum to 1 pursuant to constraint 21).

Thus, in the tone dependent error diffusion system 150, shown in FIG. 7, equation 29 can only be used as a rough estimate. Using equation 29, it can be seen from FIG. 21 that for the tone dependent thresholds the estimated range of $c[m,n]$ is given by $$-0.87 \leq c[m,n] \leq 0.87.$$ equ. 31

According to equation 31, the threshold values are set accordingly:

$$t_u(0)=t_1(0)=1$$ equ. 32

$$t_u(1)=t_1(1)=0,$$ equ. 33 which allows for some error in the estimated range of $c[m,n;a]$. Consequently, the output pixel values for the binary region will be equal to the input. Thus, the black dots in the white area are eliminated as shown in FIG. 22. The above thresholds shown in equations 32 and 33, however, do not affect the range of $c[m,n;a]$ due to the specialty of the binary region.

Figure 3:
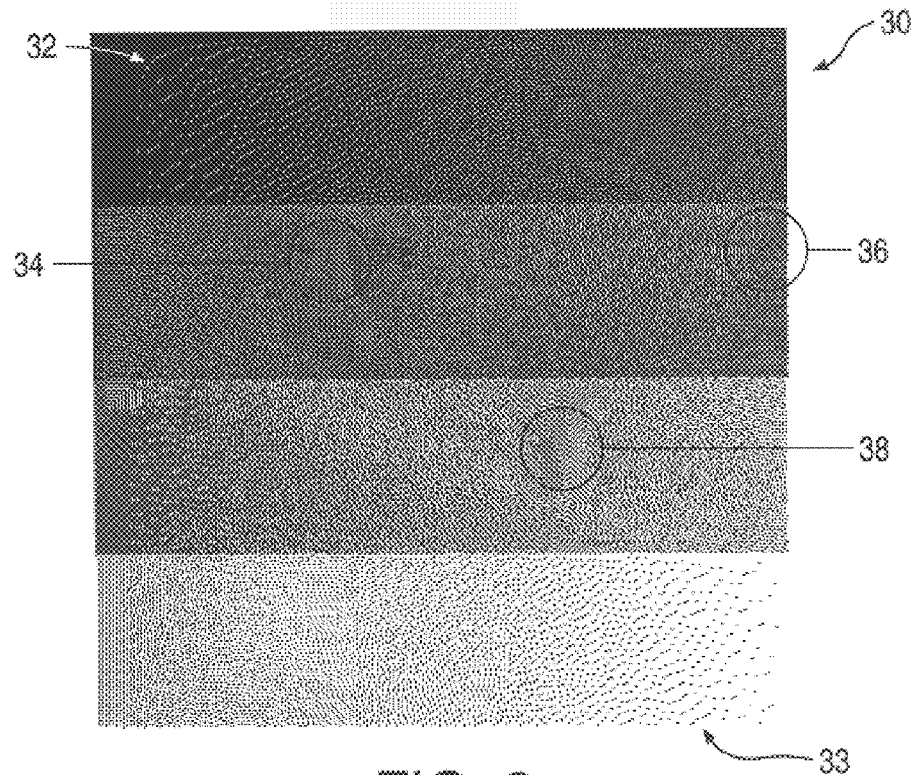
FIG. 3 is a gray level halftoned image generated by a conventional error diffusion system.
Figure 24:
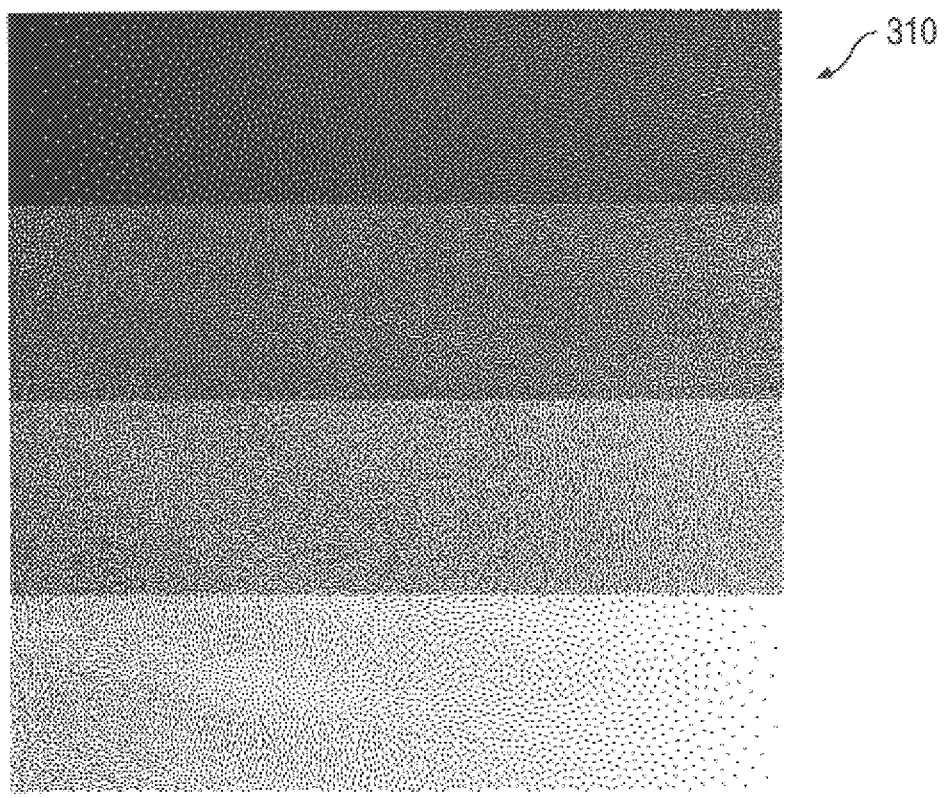
FIG. 24 is a gray level halftoned image generated using the tone dependent error diffusion system in accordance with the present invention.

FIG. 24 is a gray level halftoned image 310 generated using the tone dependent error diffusion system 150 in accordance with the present invention. Compared with image 30 in FIG. 3, the texture quality is significantly improved for all gray levels. Further, the texture patterns change consistently as pixel values change and thus the contouring artifacts are essentially unnoticeable.

Figure 25:
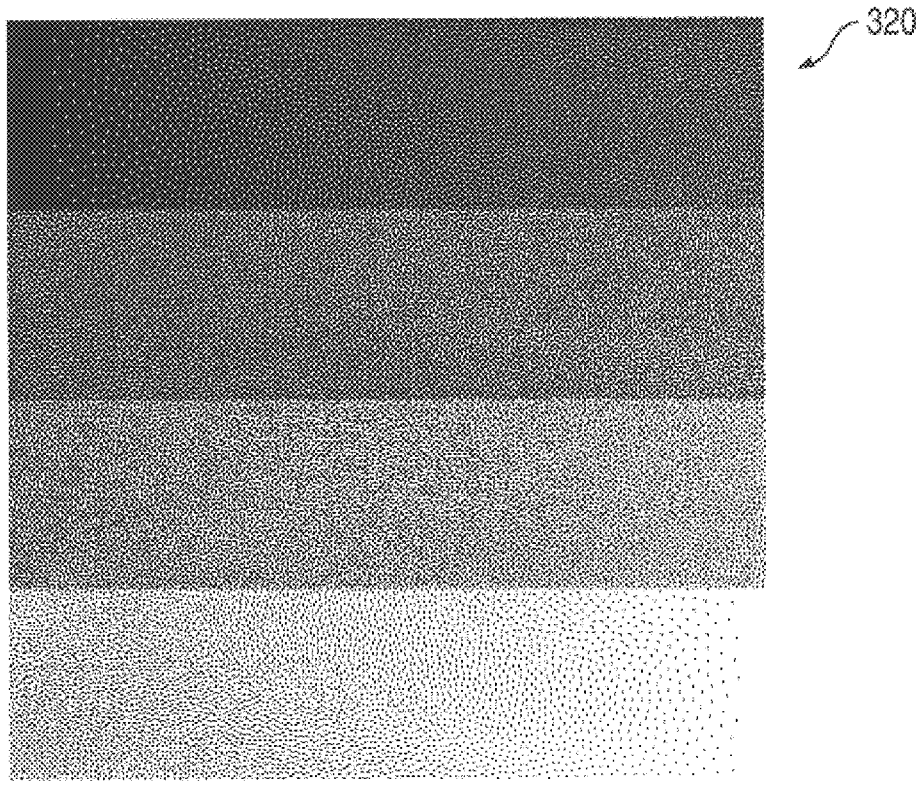
FIG. 25 is a gray level halftoned image generated using a direct binary search halftoning method.

FIG. 25 is a gray level halftoned image 320 generated using a direct binary search halftoning method. As can be seen by comparing image 310 in FIG. 24 with image 320 in FIG. 25, image 310 generated by tone dependent error diffusion system 150 has a dot distribution in the highlight and shadow areas that is comparable to image 320 generated by direct binary search.

Parallel Processing

Although serpentine scan is an effective method for reducing artifacts, it can only be implemented in serial processing because the entire scan line must be finished before processing for the next scan line begins. Consequently, the performance in terms of speed for tone dependent error diffusion is limited for parallel processing. Therefore, there exists a need for developing a tone dependent error diffusion method that uses a conventional raster scan.

Figure 26:
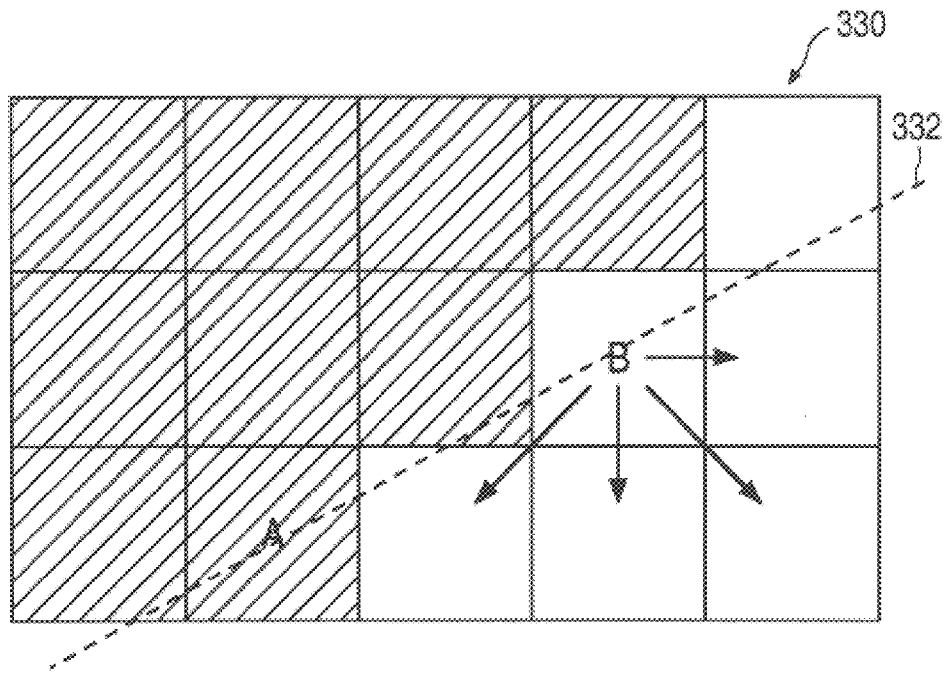
FIG. 26 is a diagram showing a matrix of pixels, where pixel A is the current pixel to be binarized.

Error diffusion with conventional raster scan produces worm artifacts for the highlight and shadow gray levels. FIG. 26 is a diagram showing a matrix of pixels 330, where pixel A is the current pixel to be binarized. Because a four-term error matrix is used in the present tone dependent error diffusion halftoning method, the quantizer error at pixel B does not propagate to pixel A. In fact, the output pixel value at pixel A is only affected by the errors generated in the shaded pixels. Consequently, the worms often form at an angle as marked by dash line 332.

Previous approaches to worm reduction in error diffusion methods that use conventional raster scan include randomizing the error weights and using a low frequency modulated threshold matrix, respectively described in R. Ulichney, "Digital Halftoning," The MIT Press, 1987, and U.S. Pat. No. 5,150,429 entitled "Image Processor with Error Diffusion Modulated Threshold Matrix," by R. L. Miller and C. M. Smith, both of which are incorporated herein by reference. While these methods can reduce worms, they also add noise. Another method of reducing worms is through the use of a larger error-weighting matrix for highlight and shadow areas, such as that described in R. Eschbach, "Reduction of Artifacts in Error Diffusion by Means of Input-Dependent weights," Journal of Electronic Imaging, Vol. 2(4), pp. 352–358, October 1993, and in P. Stucki, "MECCA-A Multiple-Error Correcting Computation Algorithm for Bilevel Image Hardcopy Reproduction," IBM Research Report RZ1060, IBM, 1981, both of which are incorporated herein by reference. The larger error-weighting matrix spreads the quantizer error over a wider area, thereby dispersing the worms. However, this method uses a large number of error weightings associated with each pixel in the area of error diffusion which is computationally complex and requires extra scan line buffers. Thus, an error diffusion method is needed that disperses worms, but does not introduce noise or add computational complexity.

An error diffusion method that uses a wide matrix and that has a limited error-weighting matrix, i.e., four non-zero terms, with variable locations may be used to reduce worms in highlight and shadow gray levels without adding compututational complexity. In other words, the error is sparsely diffused over a large area. Thus, a large error weighting matrix is used, but less than every pixel in the matrix receives the error diffusion. With a sparse error-weighting matrix, the current pixel that is to be binarized will be affected by a larger area of the halftone region. The variable locations of the error weighting terms are determined empirically.

Figure 27:
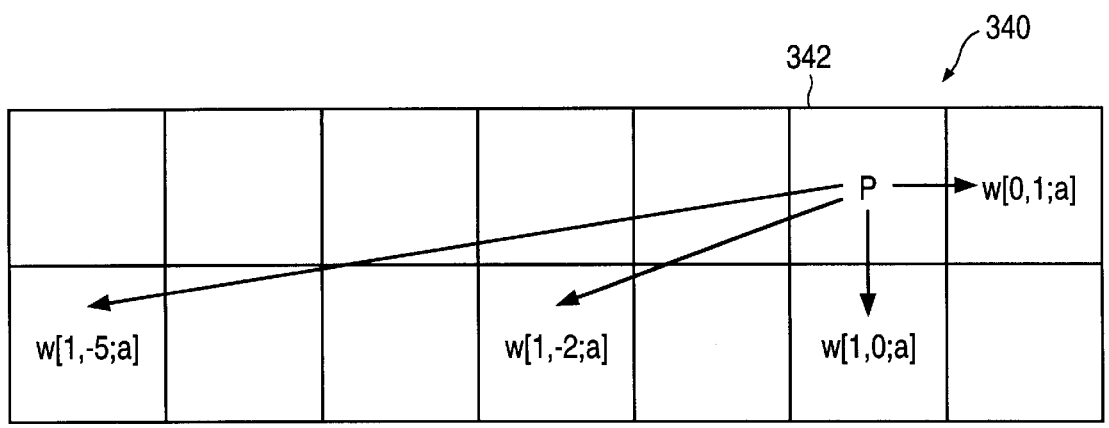
FIG. 27 is a wide error-weighting matrix used in accordance with an embodiment of the present invention.

FIG. 27 is a sparse error-weighting matrix 340 used in accordance with an embodiment of the present invention. As shown in FIG. 27, the error from the pixel being processed, i.e., pixel 342, is diffused over a large area. Error-weighting matrix 340 is used to disperse worms when the input pixel value a is either an extreme highlight or shadow gray level. By way of an example and not limitation, error-weighting matrix 340 may be used when the input pixel value a has a value that falls within the range $1/255 \leq a \leq 20/255$ and $235/255 \leq a \leq 254/255$. Thus, as shown in FIG. 27, the error-weightings w[k,l;a] may be dispersed anywhere from adjacent the pixel being processed, i.e., w[0,1;a] to several pixels away, i.e., w[1,−5;a]. Of course, if desired the error may be diffused over an even larger area, including later rows. However, because not only a few, e.g., four, error weightings are used, the use of a sparse error weighting matrix is not computationally complex.

Figure 28:
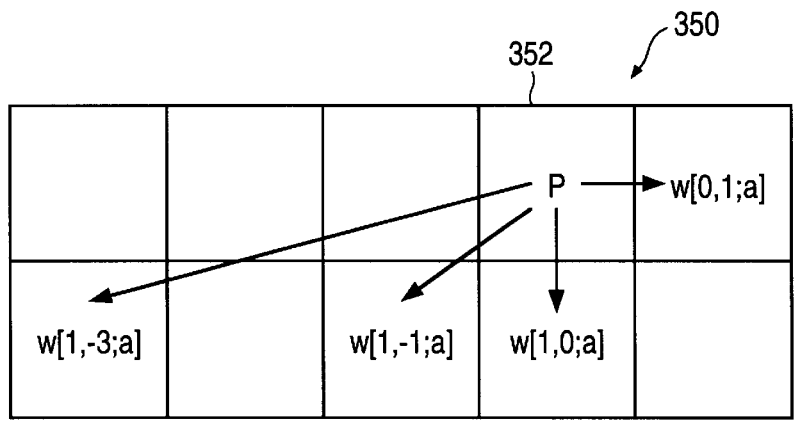
FIG. 28 is another wide error-weighting matrix used in accordance with an embodiment of the present invention.

FIG. 28 is another sparse error-weighting matrix 350 used in accordance with an embodiment of the present invention. Again, the error from the processed pixel 352 is diffused over a large area. However, error-weighting matrix 350 is used when the input pixel value a is at a transitional level between extreme tone levels and the midtones. Thus, the area over which the errors are dispersed is smaller in error-weighting matrix 350 than in error-weighting matrix 340. By way of one example, error-weighting matrix 350 may be used when the input pixel value a has a value falling within the range $21/255 \leq a \leq 33/255$ and $222/255 \leq a \leq 234/255$.

For the midtone tone levels, the four term error-weighting shown in FIG. 9 is used. The input pixel value a is in the midtone levels when $34/255 \leq a \leq 221/255$.

Figure 29:
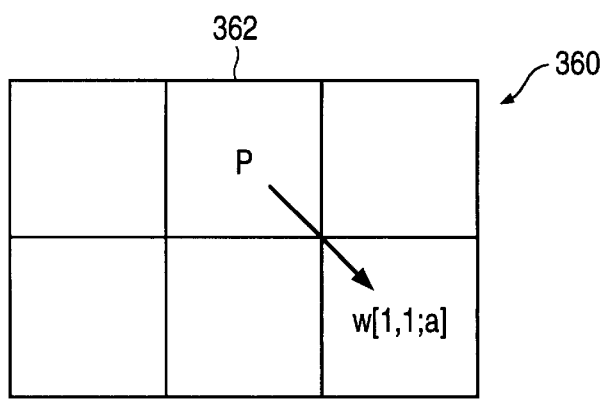
FIG. 29 is a diagram showing the distribution of the error in the diagonal direction.
Figure 30:
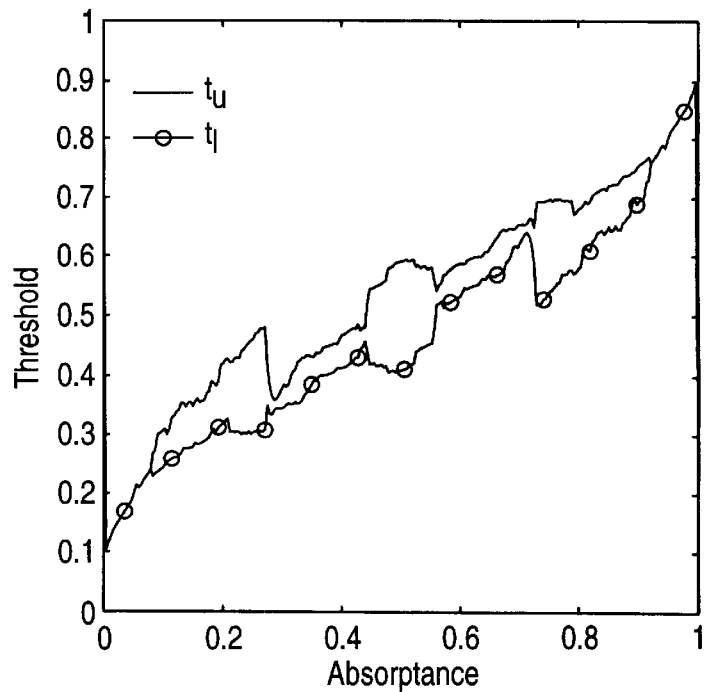
FIG. 30 shows the optimal threshold values for a tone dependent error diffusion system using a conventional raster scan.

Similar to the serpentine scan tone dependent error diffusion system, where the input pixel value is at either extreme, i.e., 0 or 255, a one term error weighting matrix is used. For a conventional raster scan, the start-up artifacts occur at the top and the left side of the image. Thus, the error-weighting matrix 360 diffuses the error from the pixel being processed, i.e., pixel 362, to a pixel on the diagonal, as shown in FIG. 29, where w[1,1;a]=1.

It should be understood that the specific ranges of conditions 34, 35, and 36 are exemplary and not limiting. Thus, other ranges may be used if desired. Further, if desired, the transitional ranges shown in condition 35 for sparse error-weighting matrix 350 do not have to be used. Thus, different error-weighting matrices may be used for extreme highlight and shadow levels and midtone levels.

Figure 31A:
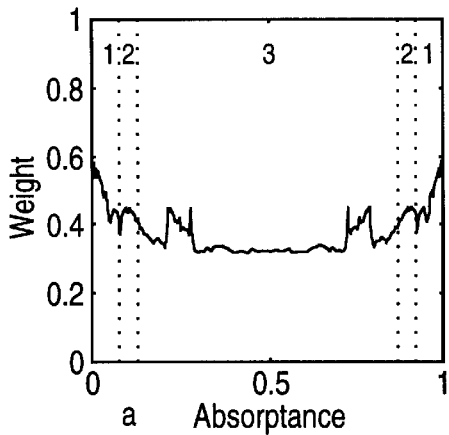
FIGS. 31A, 31B, 31C, 31D, and 31E show the optimal error-weighting values and the positions for a tone dependent error diffusion system using a conventional raster scan.
Figure 31B:
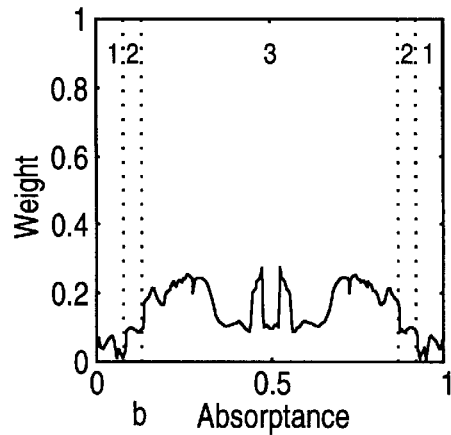
Figure 31C:
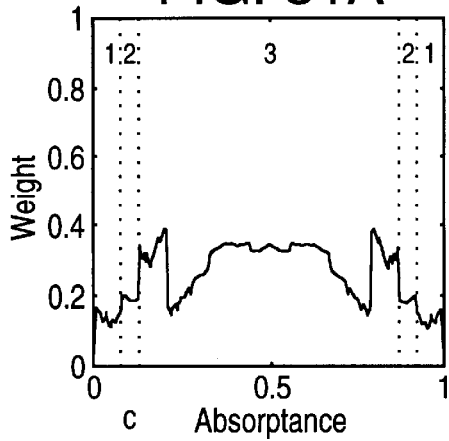
Figure 31D:
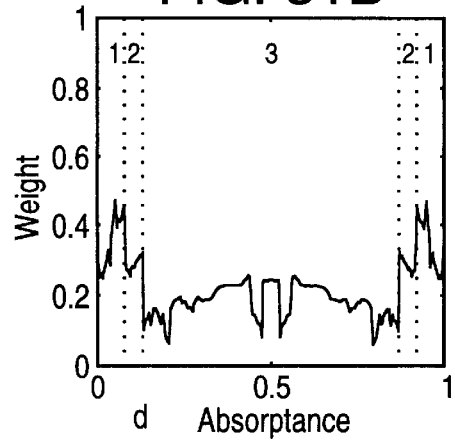
Figure 31E:
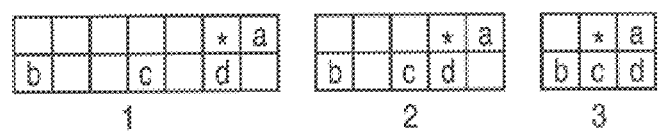

The error-weighting matrices of FIGS. 27, 28, 29, and FIG. 9, have a similar effect as using a larger matrix in terms of dispersing the worms. The optimal values of the error weights and thresholds are determined using the method described above. The optimal error weights and thresholds for a tone dependent error diffusion system using a conventional raster scan are shown in FIG. 30 and FIGS. 31A, 31B, 31C, and 31D, respectively. FIG. 31E shows the location of the pixels to which the error weightings are diffused. FIG. 31A shows the error weighting that is diffused to the pixel that is directly to the right of the processed pixel. FIGS. 31B, 31C, and 31D show the error weightings that are diffused to the pixels, from left to right, in the row that is under the processed pixel. As shown in FIGS. 31A–31D, there are three regions of absorptance divided into highlight and shadow areas (region 1), transition areas (region 2) and the midtones (region 3).

Figure 32:
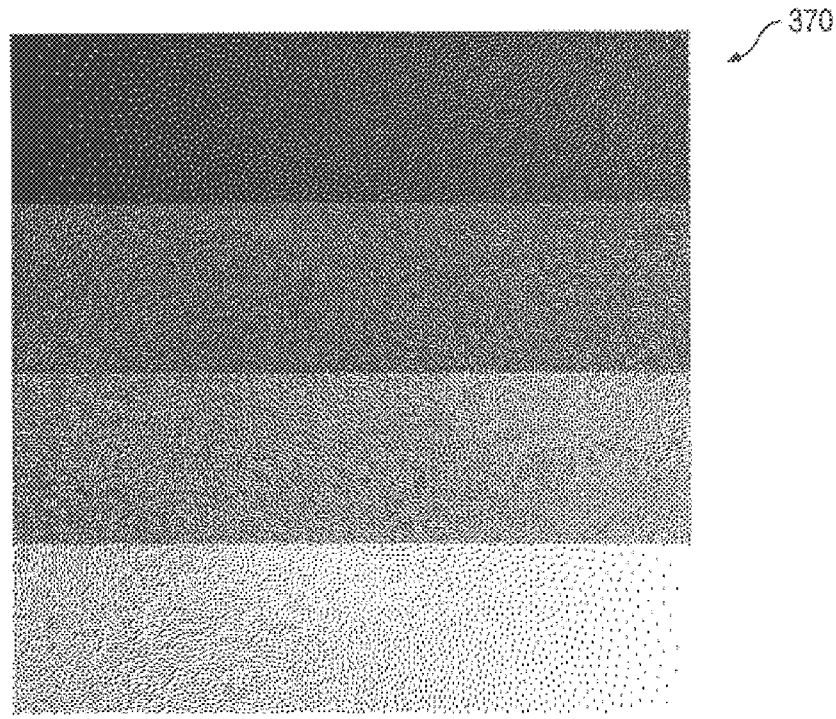
FIG. 32 is a gray level halftoned image generated using a raster scan tone dependent error diffusion method with the thresholds and error weightings shown in FIGS. 30 and 31A–31D.

FIG. 32 is a gray level halftoned image 370 generated using a raster scan tone dependent error diffusion method with the thresholds and error weightings shown in FIGS. 30 and 31A–31D. As can be seen in FIG. 32, the worms and other objectionable artifacts have been reduced significantly compared with the image 30 (FIG. 3) generated by the conventional error diffusion system 10. However, image 370 has some artifacts that are more noticeable than those in image 310 generated with tone dependent error diffusion system 150 (FIG. 7) using a serpentine scan.

To further improve the halftone image quality, a matrix with more terms in the highlight and shadows areas may be used, but this requires more computation. Another approach is to mix the conventional raster scan and serpentine scan. For example, the processing can occur with two consecutive scan lines in one direction followed by two scan lines in the opposite direction, hereinafter referred to as 2-row serpentine. The use of 2-row serpentine scanning is more parallelizable compared with regular serpentine scan. Further, 2-row serpentine scanning is more effective for reducing artifacts than the use of conventional raster scanning.

Figure 33:
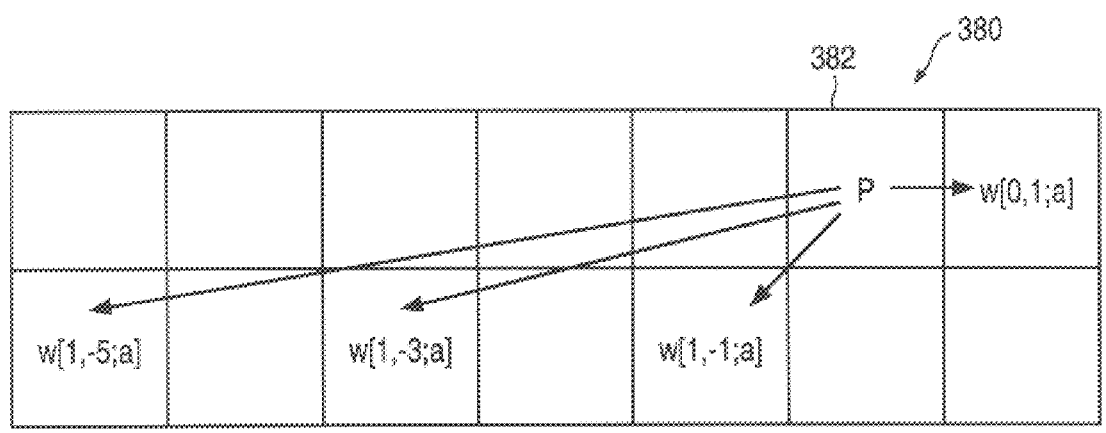
FIG. 33 is a wide error-weighting matrix used in accordance with an embodiment of the present invention.

An error diffusion system using 2-row serpentine scan does not produce long diagonal worms. However, short worms may be generated if a small error weighting matrix is used. Consequently, as shown in FIG. 33, a sparse error weighting matrix 380 is used for extreme gray levels to disperse the errors from the processed pixel 382. FIG. 33 is used when the input pixel value a falls within the range $1/255 \leq a \leq 8/255$ and $247/255 \leq a \leq 254/255$.

When the input pixel value a falls within a transitional range, e.g., $9/255 \leq a \leq 21/255$ and $234/255 \leq a \leq 246/255$, the sparse error weighting matrix 350 of FIG. 28 can be used.

Figure 34:
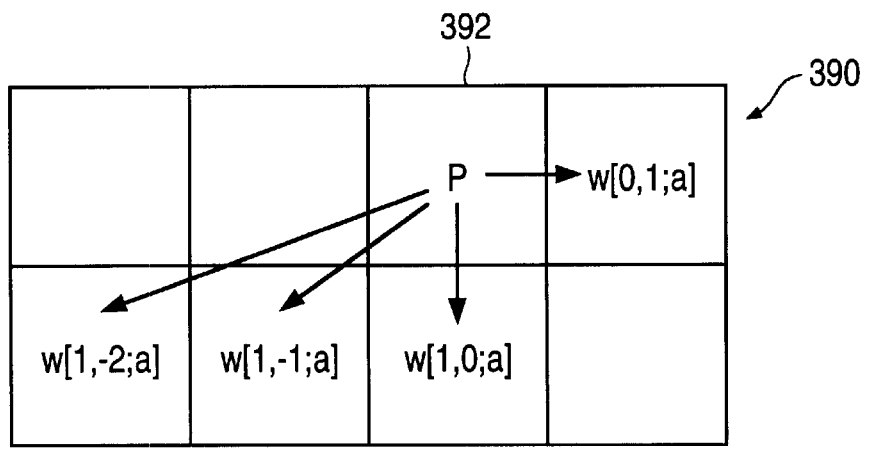
FIG. 34 is another wide error-weighting matrix used in accordance with an embodiment of the present invention.
Figure 35:
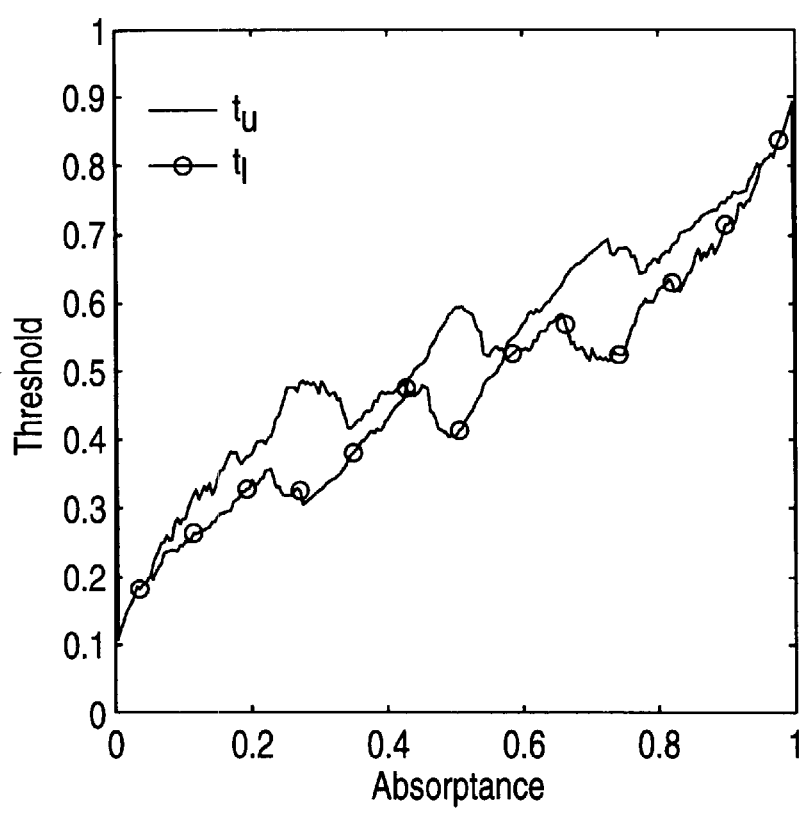
FIG. 35 shows the optimal threshold values for a tone dependent error diffusion system using a 2-row serpentine scan.

For the midtone range, e.g., 22/255≦a≦233/255, the error weighting matrix 390, shown in FIG. 34 can be used to disperse the errors from pixel 392.

Again, to avoid start-up artifacts, a one term error matrix, such as matrix 300 shown in FIG. 23, is used to vertically disperse errors from the processed pixel when the input pixel value a is 1 or 0.

Figure 36A:
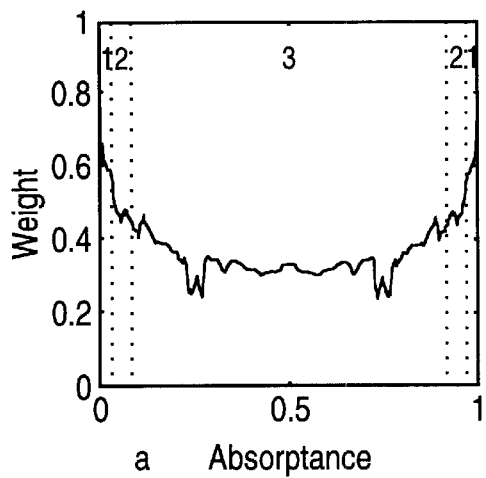
FIGS. 36A, 36B, 36C, 36D, and 36E show the optimal error-weighting values and their positions for a tone dependent error diffusion system using a 2-row serpentine scan.
Figure 36B:
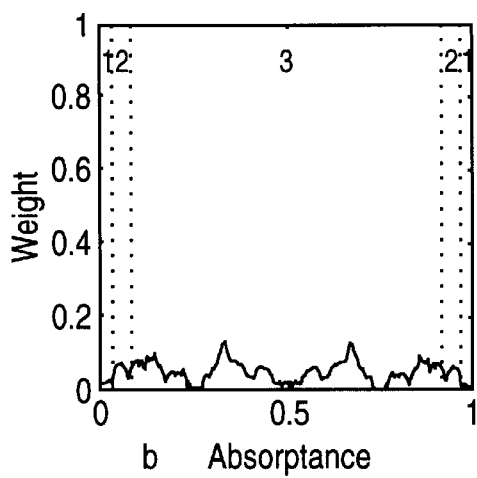
Figure 36C:
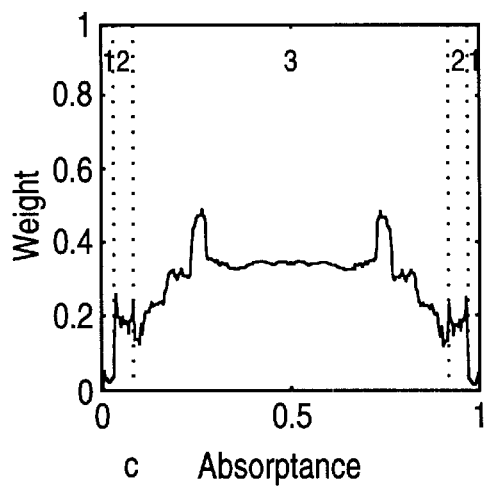
Figure 36D:
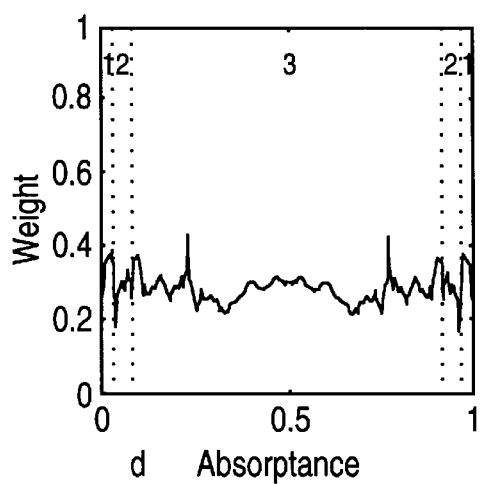
Figure 36E:
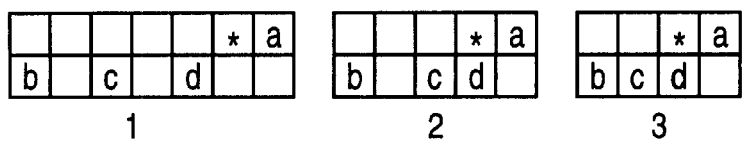

The optimal values of the error weights and thresholds are determined using the method described above. The optimal error weights and thresholds for a tone dependent error diffusion system using a 2-row serpentine scan are shown in FIG. 35 and FIGS. 36A, 36B, 36C, and 36D. FIG. 36E shows the location of the pixels to which the error weightings are diffused. FIG. 36A shows the error weighting that is diffused to the pixel that is directly to the right of the processed pixel. FIGS. 36B, 36C, and 36D show the error weightings that are diffused to the pixels, from left to right, in the row that is under the processed pixel. As shown in FIGS. 36A–36D, there are three regions of absorptance divided into highlight and shadow areas (region 1), transition areas (region 2) and the midtones (region 3).

Figure 37:
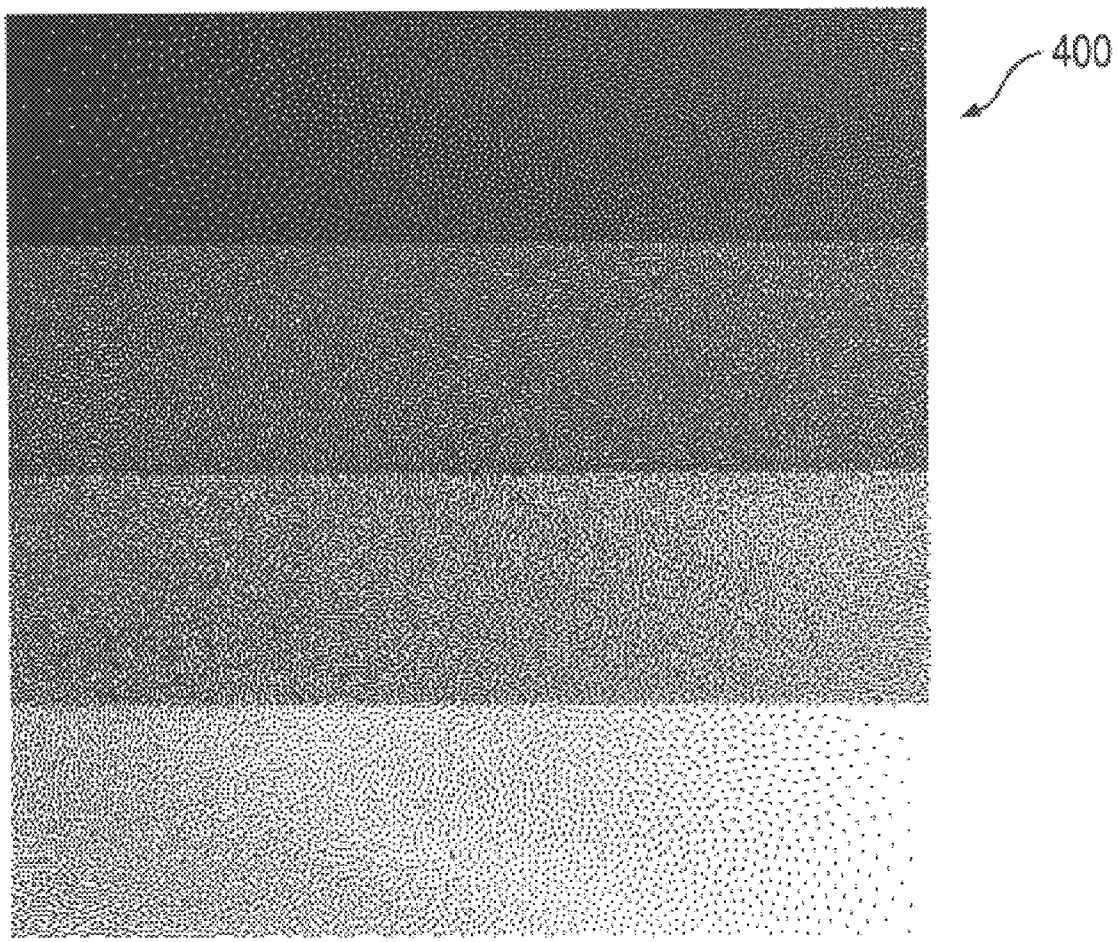
FIG. 37 is a gray level halftoned image generated using a 2-row serpentine scan tone dependent error diffusion method with the thresholds and error weightings shown in FIGS. 35 and 36A–36D.

FIG. 37 is a gray level halftoned image 400 generated using a 2-row serpentine tone dependent error diffusion method with the thresholds and error weightings shown in FIGS. 35 and 36A–36D.

It should be understood that variation of the present tone dependent error diffusion halftoning method are possible, such as using different filter sets for different scan lines, e.g., use one filter set for even-numbered lines and another filter set for odd-numbered lines. This cannot perform worse than the single filter set case, and would likely improve texture quality, especially for the 2-row serpentine scan. While this will not increase the computational complexity by much, there may be a significant increase in the design complexity.

In one embodiment, the look-up tables and method for controlling the error diffusion process are provided on a computer readable medium, such as a microdiskette or floppy diskette as a printer driver. This printer driver is then installed into the computer, such as computer 122 in FIG. 5, so that the program is installed in the computer's RAM. Such a program may be also installed in the printer and, in one embodiment, installed in firmware within the printer. This program would depend on the print mode or printhead parameters as well as other factors. All logic functions may be implemented in hardware or software. If hardware is used, the various table values would be available to the circuitry implementing the halftone method via bus lines. The method may also be carried out by an ASIC, which controls the timing and transfer of data to the various logic devices and look-up tables as well as to and from the image map, as would be understood by those skilled in the art after reading this disclosure.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of tone dependent error diffusion halftoning, the method comprising:

performing error diffusion with at least one threshold value and a plurality of error weightings; and obtaining said at least one threshold value and said plurality of error weightings based on an input pixel value, wherein the at least one threshold value and plurality of error weightings are determined using a cost function.

2. The method of claim 1, the method further comprising:

inputting an input pixel value;

generating a modified pixel value based on the input pixel value and diffused quantizer errors from previously processed pixels;

comparing the at least one threshold value with the modified pixel value to generate a binary output pixel value;

generating a quantizer error based on the difference between the binary output pixel value and the modified pixel value; and diffusing the quantizer error with the plurality of error weightings to pixels to be subsequently processed.

3. The method of claim 2, wherein obtaining at least one threshold value comprises obtaining an upper threshold value and a lower threshold value, comparing the at least one threshold value with the modified pixel value comprises comparing the upper threshold value with the modified pixel value and comparing the lower threshold value with the modified pixel value to generate the binary output pixel.

4. The method of claim 3, wherein if the modified pixel value is between the upper threshold value and the lower threshold value, the method further comprises:

providing a binary bitmap pattern having an approximately midtone level; and using the pixel value of the binary bitmap pattern that is in the same coordinates of the input pixel to generate the binary output pixel.

5. The method of claim 3, wherein if the modified pixel value is between the upper threshold value and the lower threshold value, the method further comprises:

providing a screen pattern having a matrix of threshold values; and using the threshold value of the screen pattern that is in the same coordinates of the input pixel to generate the binary output pixel.

6. The method of claim 2, further comprising diffusing the entire quantizer error in an approximately vertical direction when halftoning a region with absorptance 0 or 1.

7. The method of claim 2, wherein the method further comprises:

diffusing the entire quantizer error in a diagonal direction when halftoning a region with absorptance of 0 or 1.

8. The method of claim 2, wherein the method further comprises:

diffusing the quantizer error with the plurality of error weightings to pixels to be subsequently processed over a first area when the input pixel value is at a highlight or shadow tone level, wherein less then all the pixels in the first area receive a portion of the quantizer error;

diffusing the quantizer error with the plurality of error weightings to pixels to be subsequently processed over a second area when the input pixel value is at a midtone level;

wherein the first area is larger than the second area.

9. The method of claim 8, further comprising:

diffusing the quantizer error with the plurality of error weightings to pixels to be subsequently processed over a third area when the input pixel value is at a transition level between the highlight and midtone levels and the shadow and midtone levels, wherein less then all the pixels in the third area receive a portion of the quantizer error;

wherein the third area is larger than the second area and smaller than the first area.

10. The method of claim 1, wherein at least one threshold value and the plurality of error weightings are optimized comprises:
    providing a patch having a tone level;
    generating a first halftone pattern of the patch by direct binary search halftoning;
    generating a second halftone pattern of the patch by error diffusion halftoning using an initial threshold value and initial error weightings;
    comparing the first halftone pattern with the second halftone pattern;
    altering the initial threshold value and initial error weightings to minimize a first cost function.

11. The method of claim 10, wherein the first cost function is:

$$\varepsilon = \sum_u \sum_v [G^{TDED}(u, v) - G^{DBS}(u, v)]^2$$

where $G^{DBS}(u,v)$ denotes the expectation magnitude of the fast Fourier transform of the first halftone pattern and $G^{TDED}(u,v)$ denotes the expectation magnitude of the fast Fourier transform of the second halftone pattern.

12. The method of claim 1, wherein at least one threshold value and the plurality of error weightings are optimized comprises:
    providing a patch having a tone level;
    filtering the patch using a human visual system model to generate a first filtered image;
    generating a first halftone pattern of the patch by error diffusion halftoning using an initial threshold value and initial error weightings;
    filtering the first halftone pattern using a human visual system model to generate a second filtered image;
    comparing the first filtered image with the second filtered image;
    altering the initial threshold value and initial error weightings to minimize a first cost function.

13. The method of claim 12, wherein the first cost function is the total perceived squared error.

14. The method of claim 13, further comprising:
    providing a second patch having a tone level;
    generating a second halftone pattern of the second patch by direct binary search halftoning;
    generating a third halftone pattern of the second by error diffusion halftoning using an initial threshold value and initial error weightings;
    comparing the second halftone pattern with the third halftone pattern;
    altering the initial threshold value and initial error weightings to minimize a second cost function that is $$\varepsilon = \sum_u \sum_v [G^{TDED}(u, v) - G^{DBS}(u, v)]^2$$

where $G^{DBS}(u,v)$ denotes the expectation magnitude of the fast Fourier transform of the second halftone pattern and $G^{TDED}(u,v)$ denotes the expectation magnitude of the fast Fourier transform of the third halftone pattern;
    wherein the first cost function is used for tone levels at the extreme ends of a tone level range and the second cost function is used for tone levels at the midtones of the tone level range.

15. The method of claim 1, further comprising preventing start-up artifacts by adding a random variable to the modification term, wherein the modification term is the sum of the diffused quantizer errors from previously processed pixels.

16. A method of optimizing the tone dependent thresholds and error weightings for a tone dependent error diffusion halftoning system, the method comprising:
    (a) providing a patch having a first tone level;
    (b) generating a first halftone pattern of the patch by direct binary search halftoning;
    (c) generating a second halftone pattern of the patch by error diffusion halftoning using an initial threshold value and initial error weightings;
    (d) comparing the first halftone pattern with the second halftone pattern;
    (e) altering the initial threshold value and initial error weightings to minimize a cost function;
    (f) repeating (b) through (e) until the cost function can no longer be minimized, wherein the initial threshold values and initial error weightings are the threshold values and error weightings that minimize the cost function;
    (g) providing a second patch having a second tone level and repeating (b) through (f).

17. The method of claim 16, wherein the cost function is:

$$\varepsilon = \sum_u \sum_v [G^{TDED}(u, v) - G^{DBS}(u, v)]^2$$

where $G^{DBS}(u,v)$ denotes the expectation magnitude of the fast Fourier transform of the first halftone pattern and $G^{TDED}(u,v)$ denotes the expectation magnitude of the fast Fourier transform of the second halftone pattern.

18. The method of claim 16, further comprising repeating (a) through (g) until at least a portion of a midtone range is optimized, the method further comprising:
    providing a third patch having a tone level outside the midtone range;
    filtering the third patch using a human visual system model to generate a first filtered image;
    generating a second halftone pattern of the third patch by error diffusion halftoning using an initial threshold value and initial error weightings;
    filtering the second halftone pattern using a human visual system model to generate a second filtered image;
    comparing the first filtered image with the second filtered image;
    altering the initial threshold value and initial error weightings to minimize a second cost function.

19. The method of claim 18, wherein the second cost function is the total perceived root mean square error.

20. A method of tone dependent error diffusion halftoning, the method comprising:
    comparing an input pixel value with a threshold to determine if a dot should be printed;
    generating a quantizer error based at least on whether it was determined if a dot should be printed;
    obtaining a plurality of error weightings based on the input pixel value;
    diffusing the quantizer error with the plurality of error weightings to pixels to be subsequently processed over a first area when the input pixel value is in one of a first region and second region of tone values, wherein less than all the pixels in the first area receive a portion of the quantizer error; and diffusing the quantizer error with the plurality of error weightings to pixels to be subsequently processed over a second area when the input pixel value is in a third region of tone values, wherein the third region of tone values is greater than the first region of tone values and less than the second region of tone values and wherein the first area is larger than the second area;

diffusing the quantizer error with the plurality of error weightings to pixels to be subsequently processed over a third area when the input pixel value is in one of a fourth region of tone values and a fifth region of tone values, wherein less than all the pixels in the third area receive a portion of the quantizer error, the fourth region of tone values is greater than the first region of tone values and less than the third region of tone values and the fifth region of tone values is greater than the third region of tone values and less than the second region of tone values, and wherein the third area is larger than the second area and smaller than the first area.

21. A printing system including a printer and a computer, the printing system printing a halftoned image, the method performed by the printing system comprising:

performing tone dependent error diffusion halftoning with at least one threshold value and a plurality of error weightings determined by an input pixel value, wherein the at least one threshold value and plurality of error weightings are determined based on a cost function.

22. The system of claim 21, wherein the printer is an inkjet printer.

23. The system of claim 22, wherein the inkjet printer comprises at least one inkjet print cartridge which prints black ink.

* * * * *